United States Patent
Hara et al.

(10) Patent No.: US 7,849,265 B2
(45) Date of Patent: Dec. 7, 2010

(54) AVOIDING USE OF AN INTER-UNIT NETWORK IN A STORAGE SYSTEM HAVING MULTIPLE STORAGE CONTROL UNITS

(75) Inventors: Junichi Hara, San Jose, CA (US); Takashi Oeda, Los Altos, CA (US)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 12/000,821

(22) Filed: Dec. 18, 2007

(65) Prior Publication Data

US 2009/0157984 A1 Jun. 18, 2009

(51) Int. Cl.
*G06F 12/00* (2006.01)
(52) U.S. Cl. ............... 711/114; 711/154; 711/E12.001; 710/36; 710/38; 710/8; 710/31; 710/33
(58) Field of Classification Search .................. None
See application file for complete search history.

(56) References Cited

U.S. PATENT DOCUMENTS

| | | | |
|---|---|---|---|
| 6,779,083 B2 | 8/2004 | Ito et al. | |
| 6,832,272 B2 * | 12/2004 | Hirakawa et al. | 710/36 |
| 2002/0087723 A1 * | 7/2002 | Williams et al. | 709/240 |
| 2003/0221063 A1 * | 11/2003 | Eguchi et al. | 711/114 |
| 2004/0148380 A1 * | 7/2004 | Meyer et al. | 709/223 |
| 2007/0091903 A1 * | 4/2007 | Atkinson | 370/401 |
| 2007/0239954 A1 * | 10/2007 | Sakashita et al. | 711/165 |

OTHER PUBLICATIONS

U.S. Appl. No. 11/826,717.
Fibre Channel Framing and Signaling-3 (FC-FS-3), Rev. 0.20 INCITS working draft proposed American National Standard for Information Technology, Jun. 2, 2007.

* cited by examiner

Primary Examiner—Reginald G Bragdon
Assistant Examiner—Arvind Talukdar
(74) Attorney, Agent, or Firm—Mattingly & Malur, P.C.

(57) ABSTRACT

A storage system provides virtual ports, and is able to transfer the virtual ports among physical ports located on multiple storage control units making up the storage system. The storage system is able to manage logical volumes and/or virtual volumes and virtual ports as a group when considering whether to move logical/virtual volumes and/or virtual ports to another storage control unit in the storage system. When the storage system is instructed to transfer volumes, virtual ports, or a group of volumes and virtual ports among the storage control units, the storage system determines whether an inter-unit network will be required to be used following the transfer. When the storage system determines that the inter-unit network will be required if the transfer takes place, the storage system determines and presents an alternate storage control unit for the transfer to avoid use of the inter-unit network, thereby avoiding degraded performance.

20 Claims, 27 Drawing Sheets

Explanatory Drawing of
Port and Volume Configuration

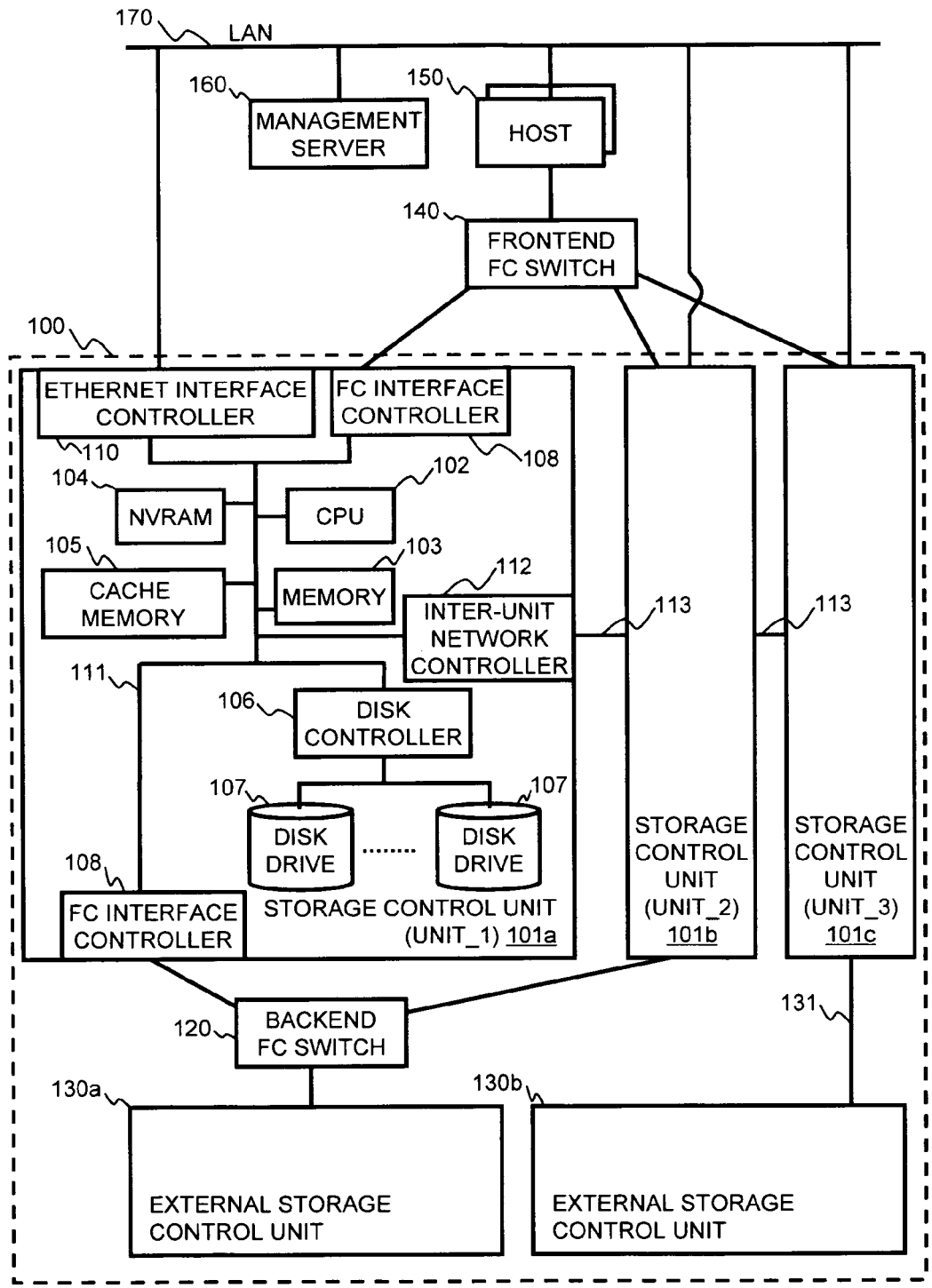
FIG. 1 System Configuration

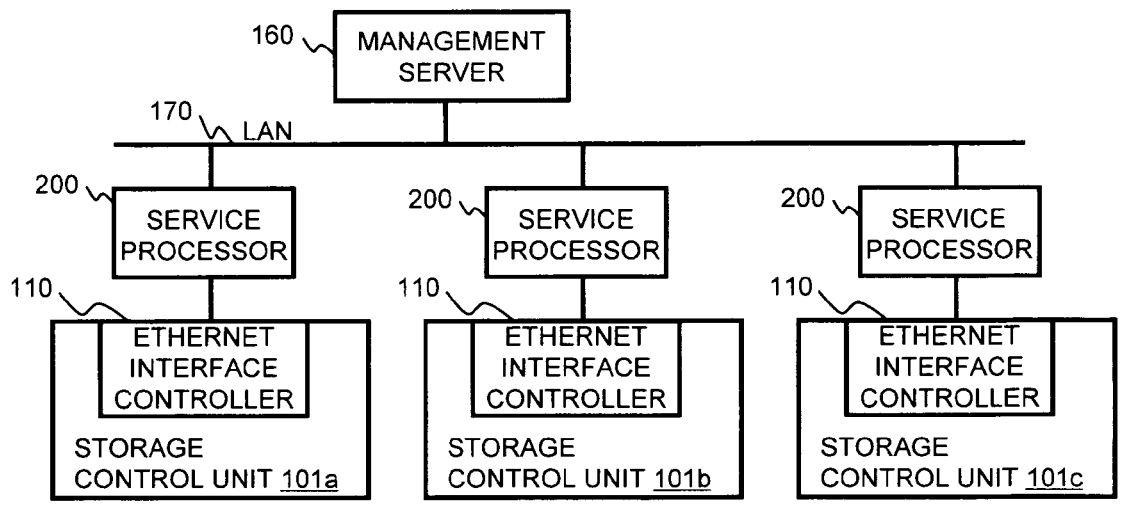
FIG. 2 Service Processor Arrangement
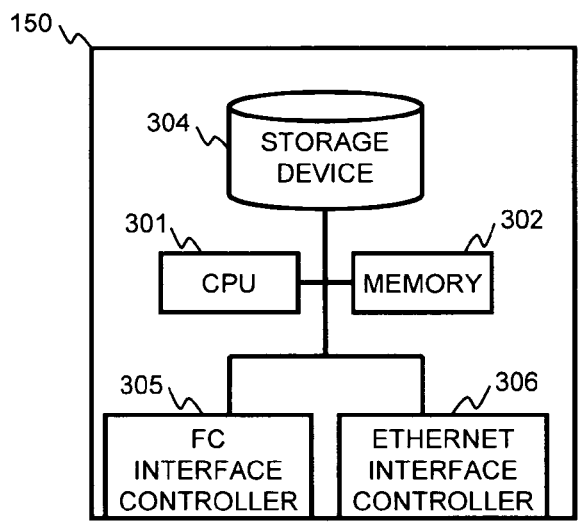
FIG. 3 Configuration of Host and Management Host
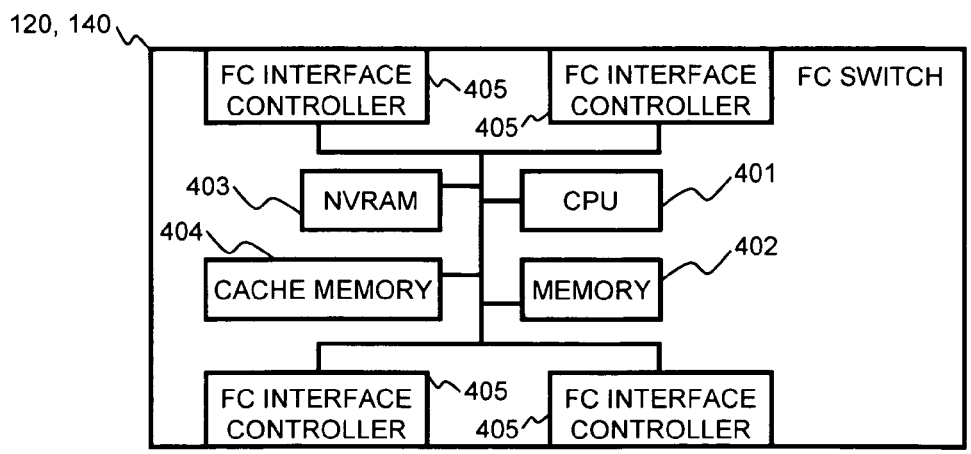
FIG. 4 Configuration of FC Switch

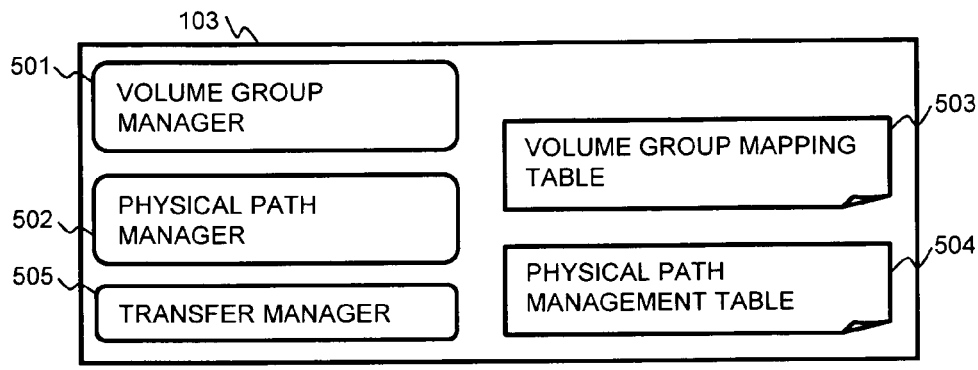
FIG. 5A Software Module Configuration on Storage Controller
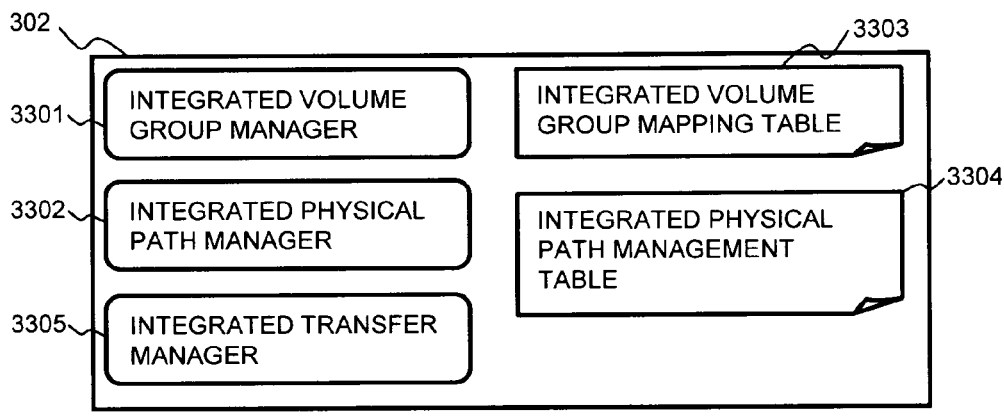
FIG. 5B Software Module Configuration on Management Server
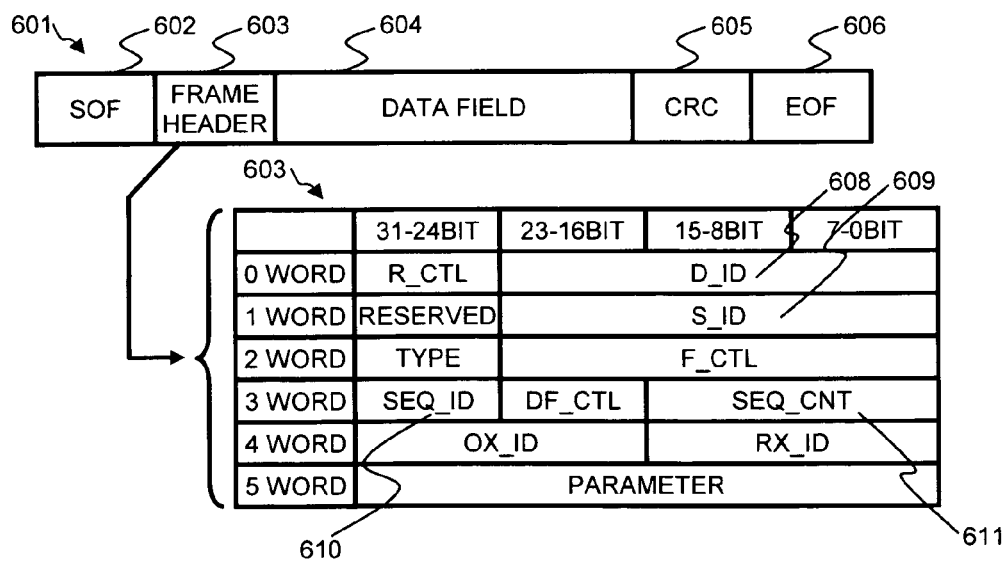
FIG. 6 Structure of a Frame (Related Art)

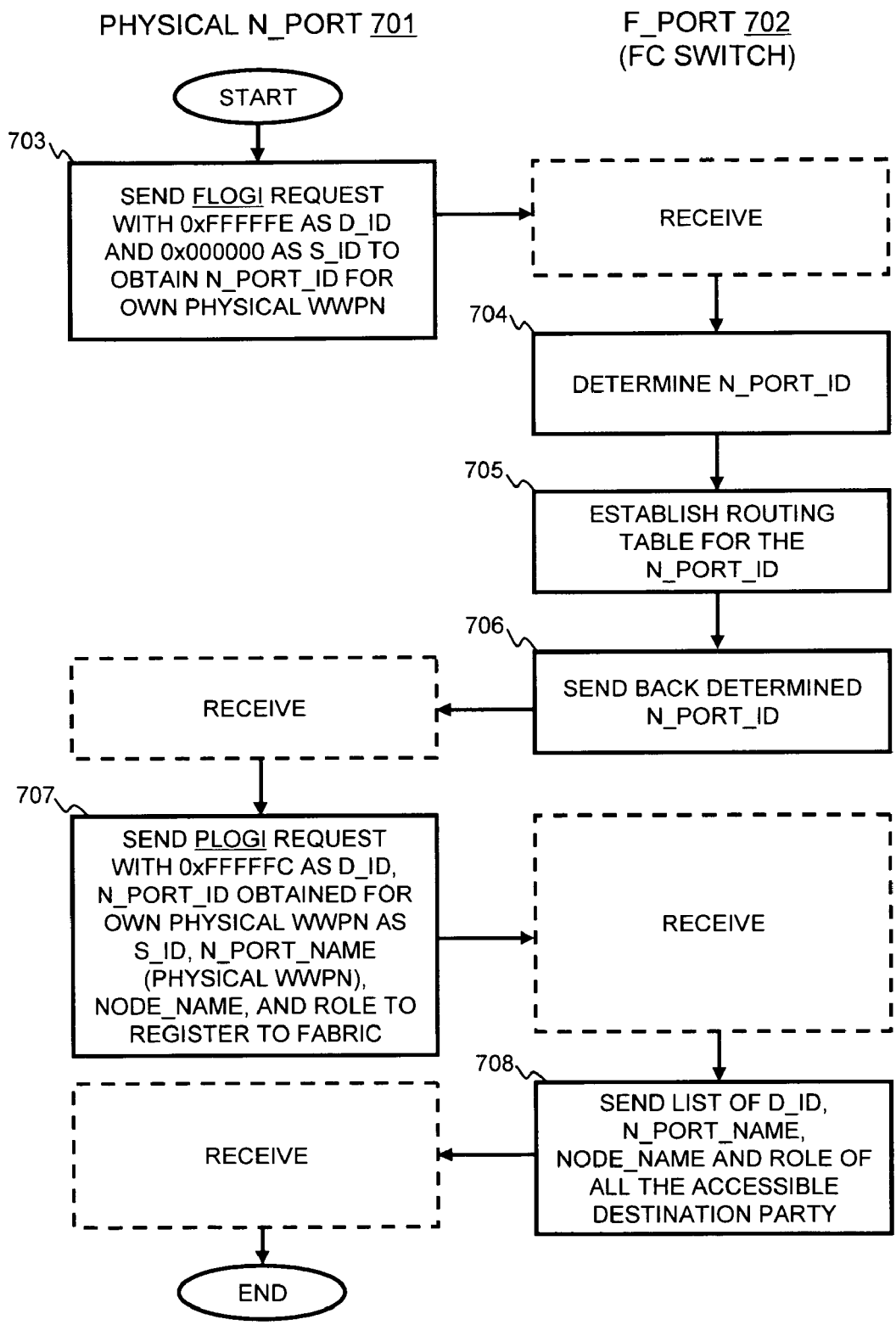
FIG. 7 Fabric Login Procedure for Physical N_Port (Related Art)

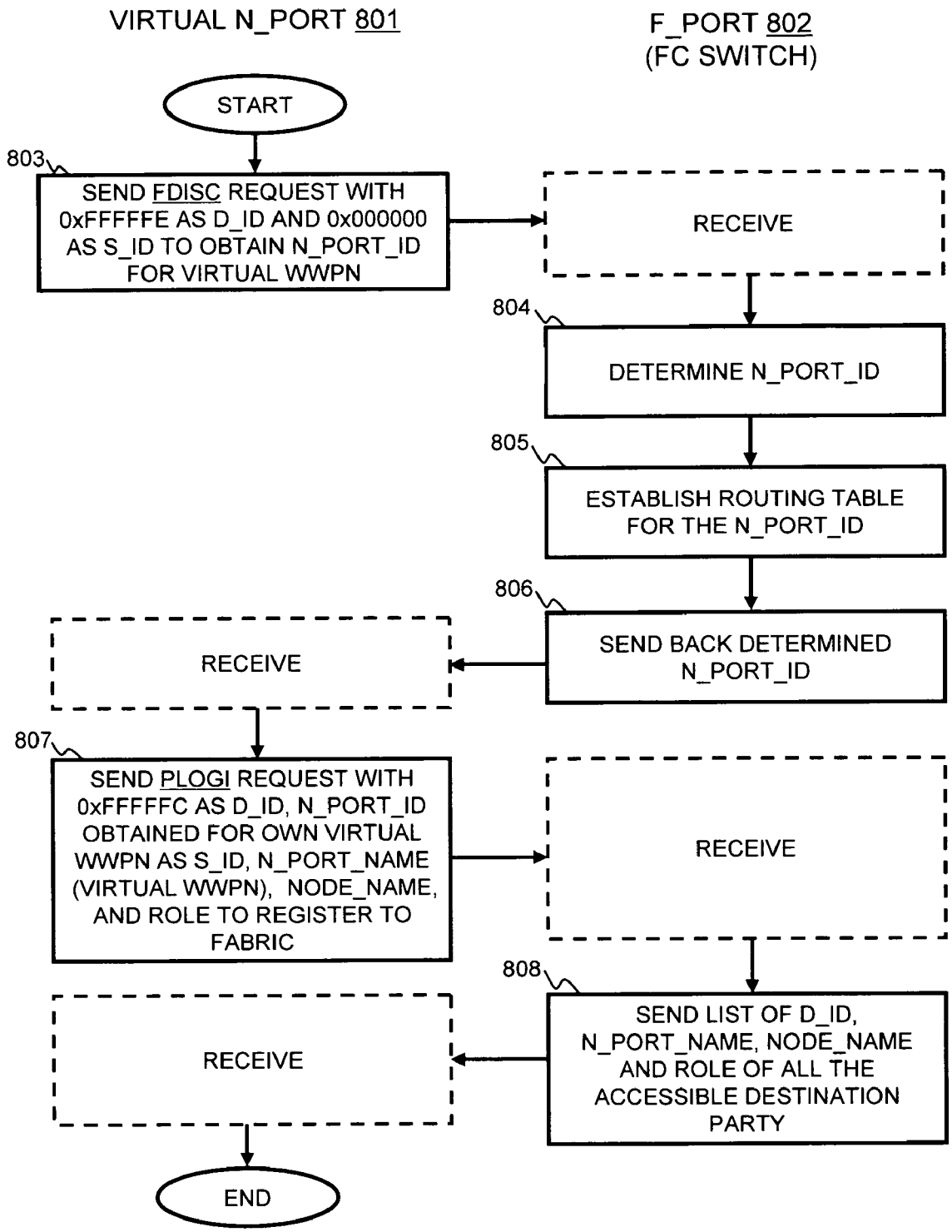
FIG. 8 Fabric Login Procedure for Virtual N_Port (Related Art)

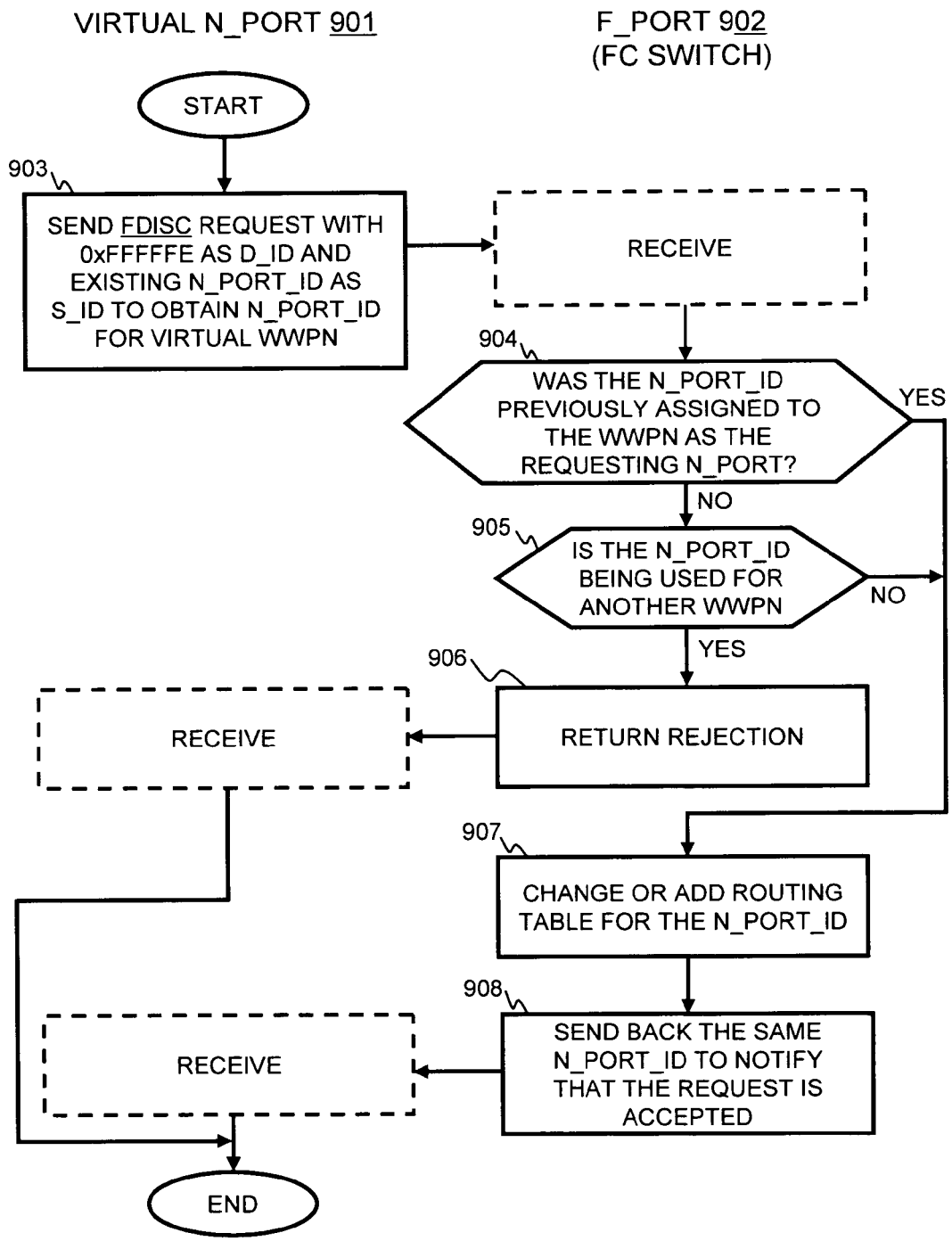
FIG. 9 Fabric Login Procedure for a Virtual N_Port to Re-use an Existing N_Port_ID, or to Specify an N_Port_ID by a Requesting Party

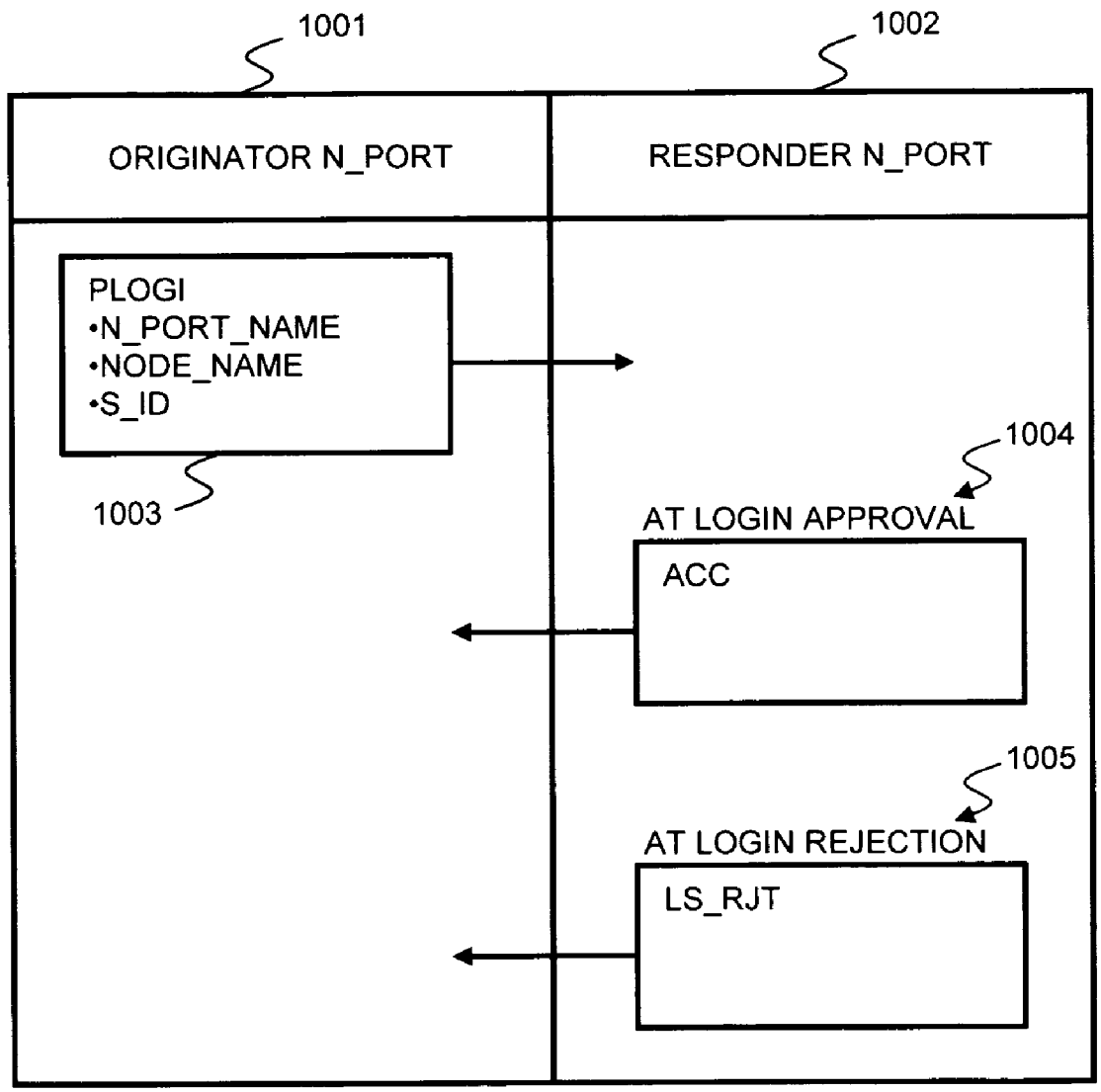
FIG. 10 Port Login to Responder from Originator (Related Art)

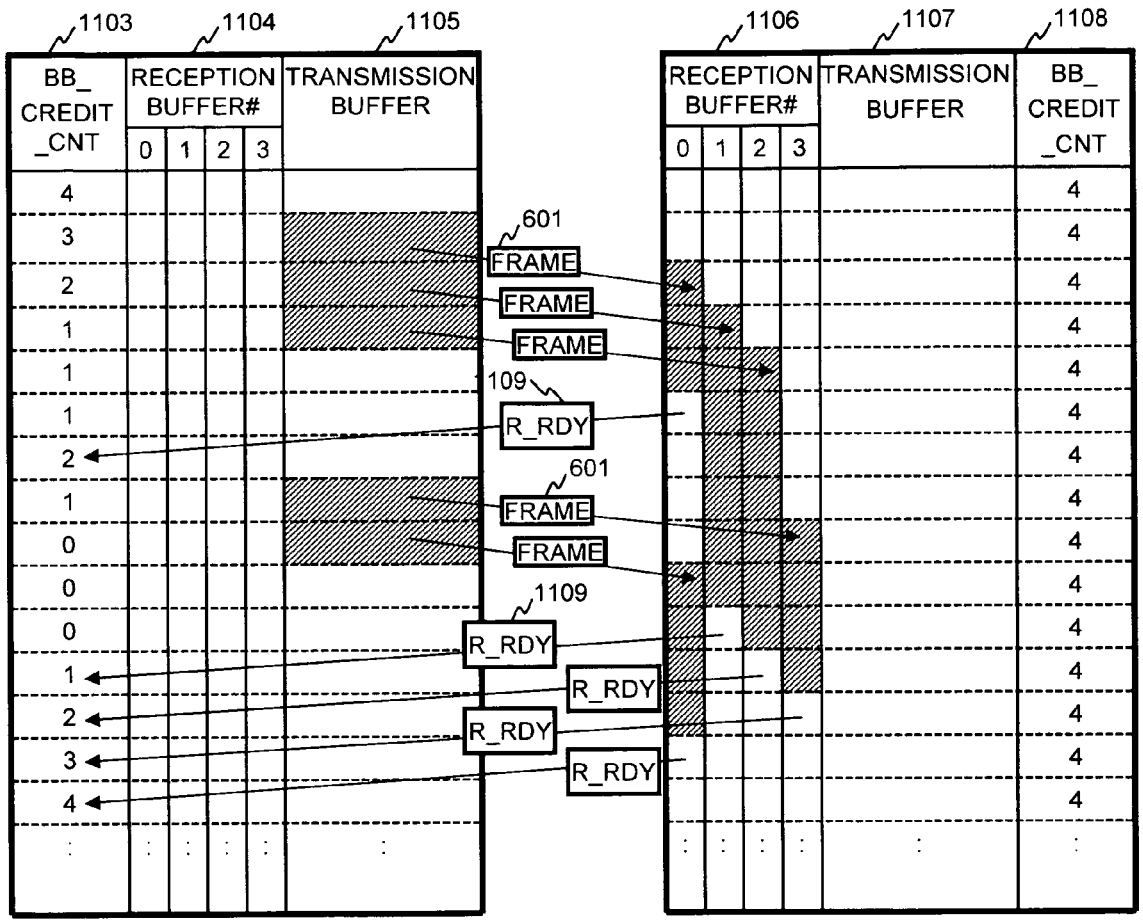
FIG. 11 BB_Credit Flow
Control Mechanism
(Related Art)

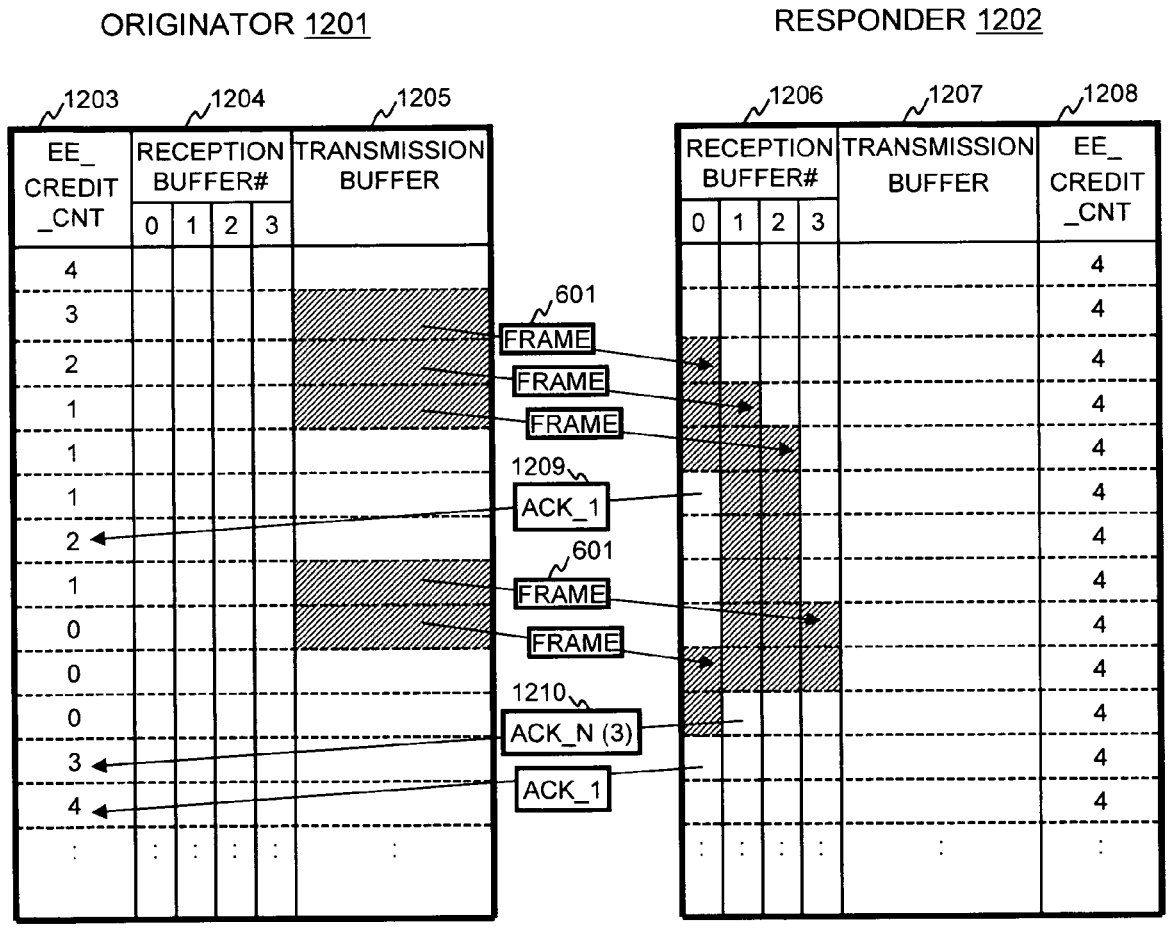
FIG. 12 EE_Credit Flow
Control Mechanism
(Related Art)

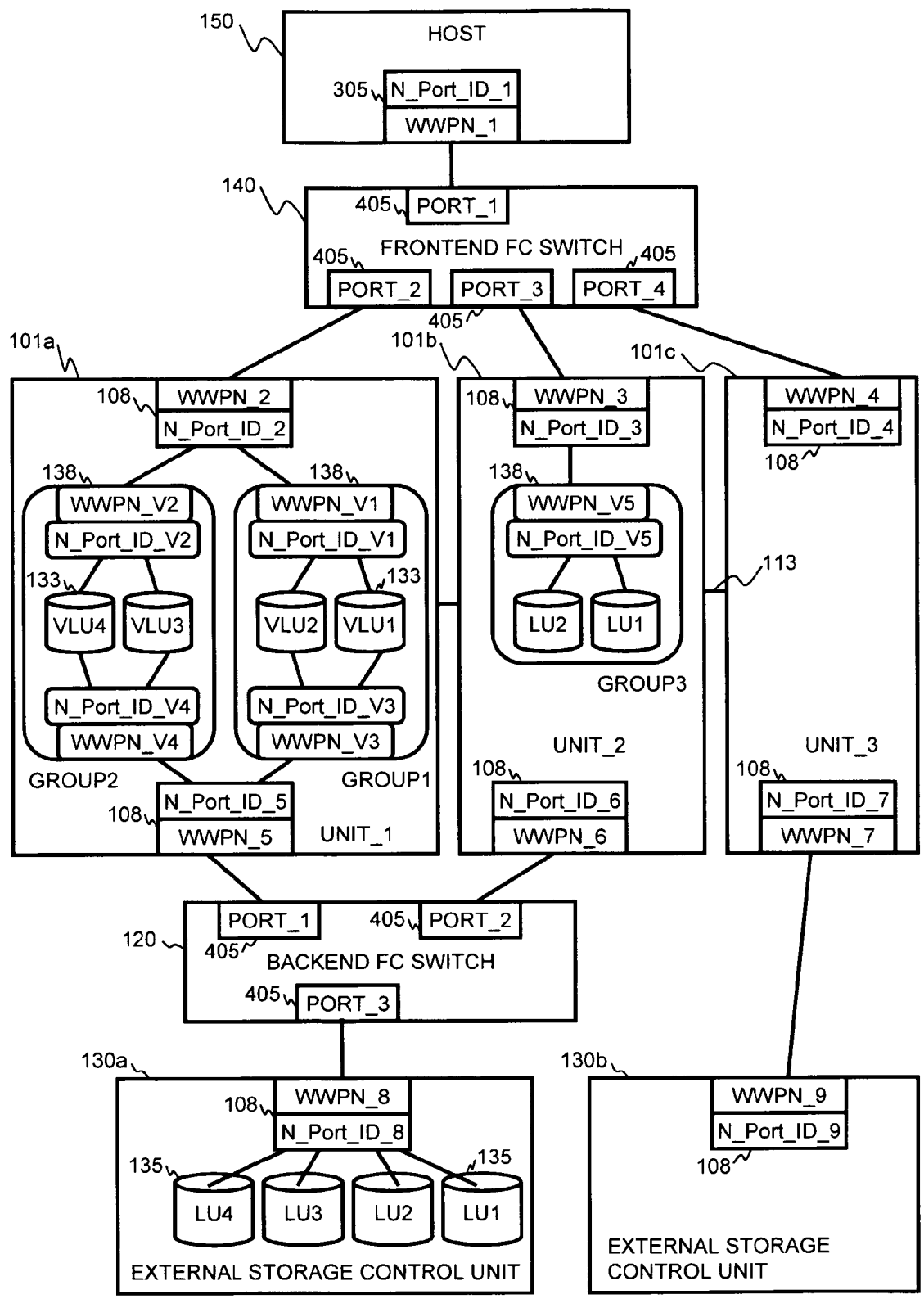
FIG. 13 Explanatory Drawing of Port and Volume Configuration

FIG. 14A Example of Volume Group Mapping Table on Unit_1

| VOLUME GROUP 1401 | TARGET HOST N_PORT 1402 | EXPORTED VOLUME 1403 | EXTERNAL N_PORT 1404 | EXTERNAL VOLUME 1405 | FRONTEND VIRTUAL N_PORT 1406 | FRONTEND N_PORT_ID 1407 | BACKEND VIRTUAL N_PORT 1408 | BACKEND N_PORT_ID 1409 | CURRENT FRONTEND PHYSICAL N_PORT 1410 | CURRENT BACKEND PHYSICAL N_PORT 1411 |
|---|---|---|---|---|---|---|---|---|---|---|
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_2 | WWPN_5 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 |

FIG. 14B Example of Volume Group Mapping Table on Unit_2

| VOLUME GROUP 1401 | TARGET HOST N_PORT 1402 | EXPORTED VOLUME 1403 | EXTERNAL N_PORT 1404 | EXTERNAL VOLUME 1405 | FRONTEND VIRTUAL N_PORT 1406 | FRONTEND N_PORT_ID 1407 | BACKEND VIRTUAL N_PORT 1408 | BACKEND N_PORT_ID 1409 | CURRENT FRONTEND PHYSICAL N_PORT 1410 | CURRENT BACKEND PHYSICAL N_PORT 1411 |
|---|---|---|---|---|---|---|---|---|---|---|
| GROUP3 | WWPN_1 | LU1, LU2 | - | - | WWPN_V5 | N_PORT_ID_V5 | - | - | WWPN_3 | - |

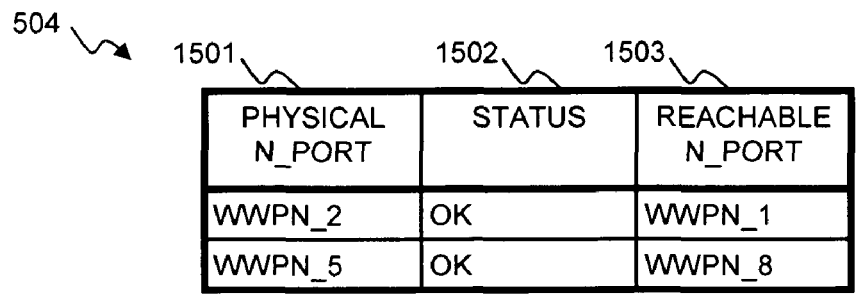
FIG. 15A Example of Physical Path Management Table on Unit_1
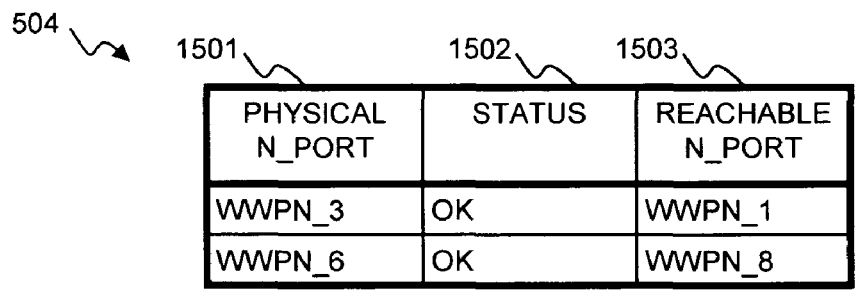
FIG. 15B Example of Physical Path Management Table on Unit_2
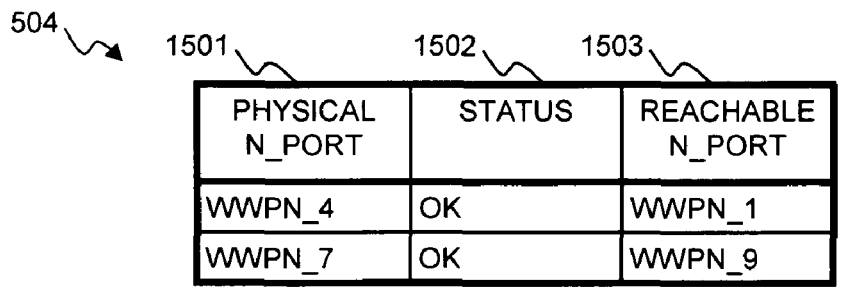
FIG. 15C Example of Physical Path Management Table on Unit_3

1600

| F_PORT | N_PORT WWPN | ASSIGNED N_PORT_ID |
|---|---|---|
| PORT_1 | WWPN_1 | N_PORT_ID_1 |
| PORT_2 | WWPN_2 | N_PORT_ID_2 |
| PORT_3 | WWPN_3 | N_PORT_ID_3 |
| PORT_4 | WWPN_4 | N_PORT_ID_4 |
| PORT_2 | WWPN_V1 | N_PORT_ID_V1 |
| PORT_2 | WWPN_V2 | N_PORT_ID_V2 |
| PORT_3 | WWPN_V5 | N_PORT_ID_V5 |

1601, 1602, 1603, 1601

FIG. 16 Example of Routing Table on Frontend FC Switch

1700

| F_PORT | N_PORT WWPN | ASSIGNED N_PORT_ID |
|---|---|---|
| PORT_1 | WWPN_5 | N_PORT_ID_5 |
| PORT_2 | WWPN_6 | N_PORT_ID_6 |
| PORT_3 | WWPN_8 | N_PORT_ID_8 |
| PORT_1 | WWPN_V3 | N_PORT_ID_V3 |
| PORT_1 | WWPN_V4 | N_PORT_ID_V3 |

1701, 1702, 1703

FIG. 17 Example of Routing Table on Backend FC Switch

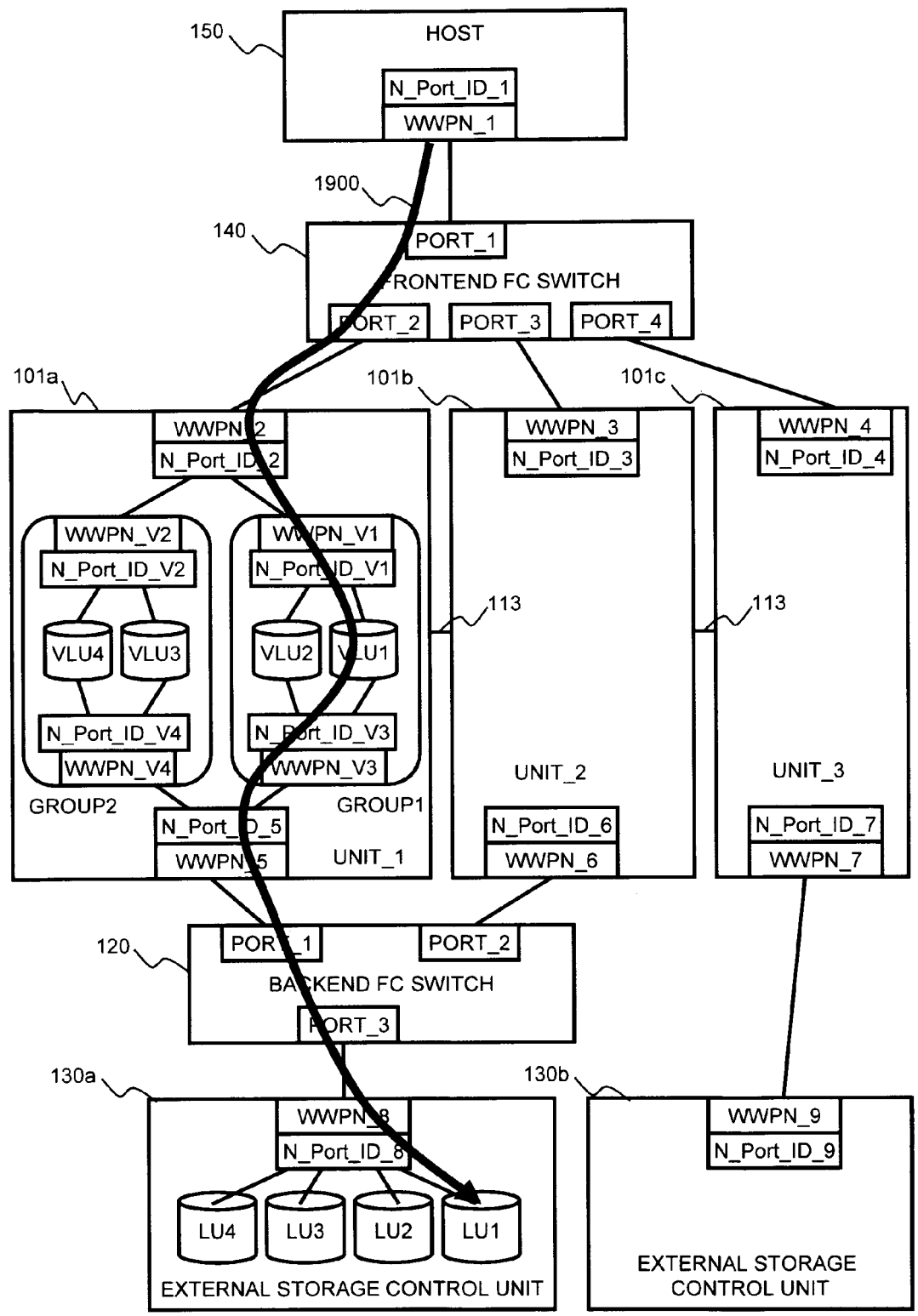
FIG. 18 Volume Accessing Path Before Port Transfer

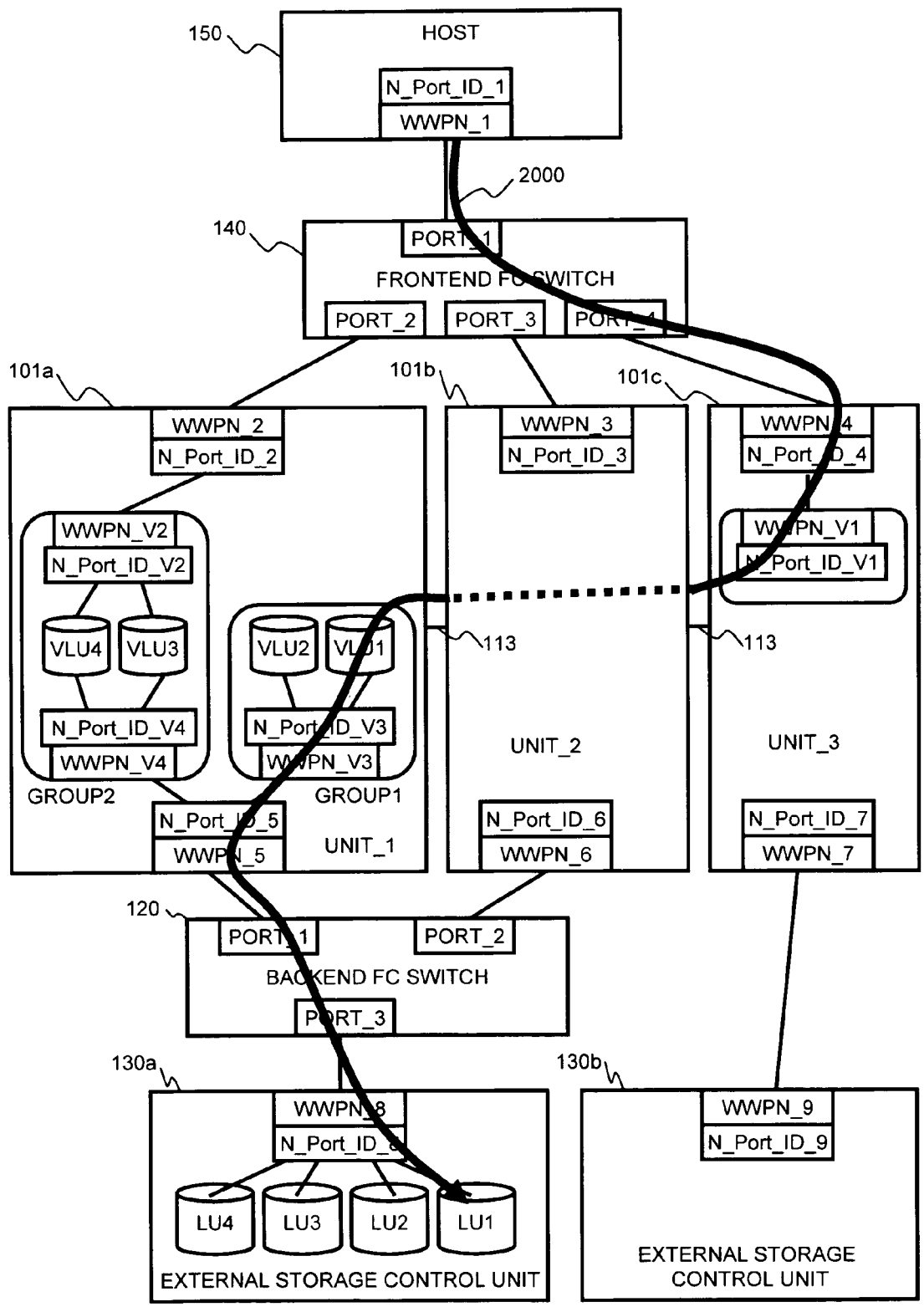
FIG. 19 Volume Accessing Path In Case That Only Frontend Virtual N_Port is Transferred to Another Unit

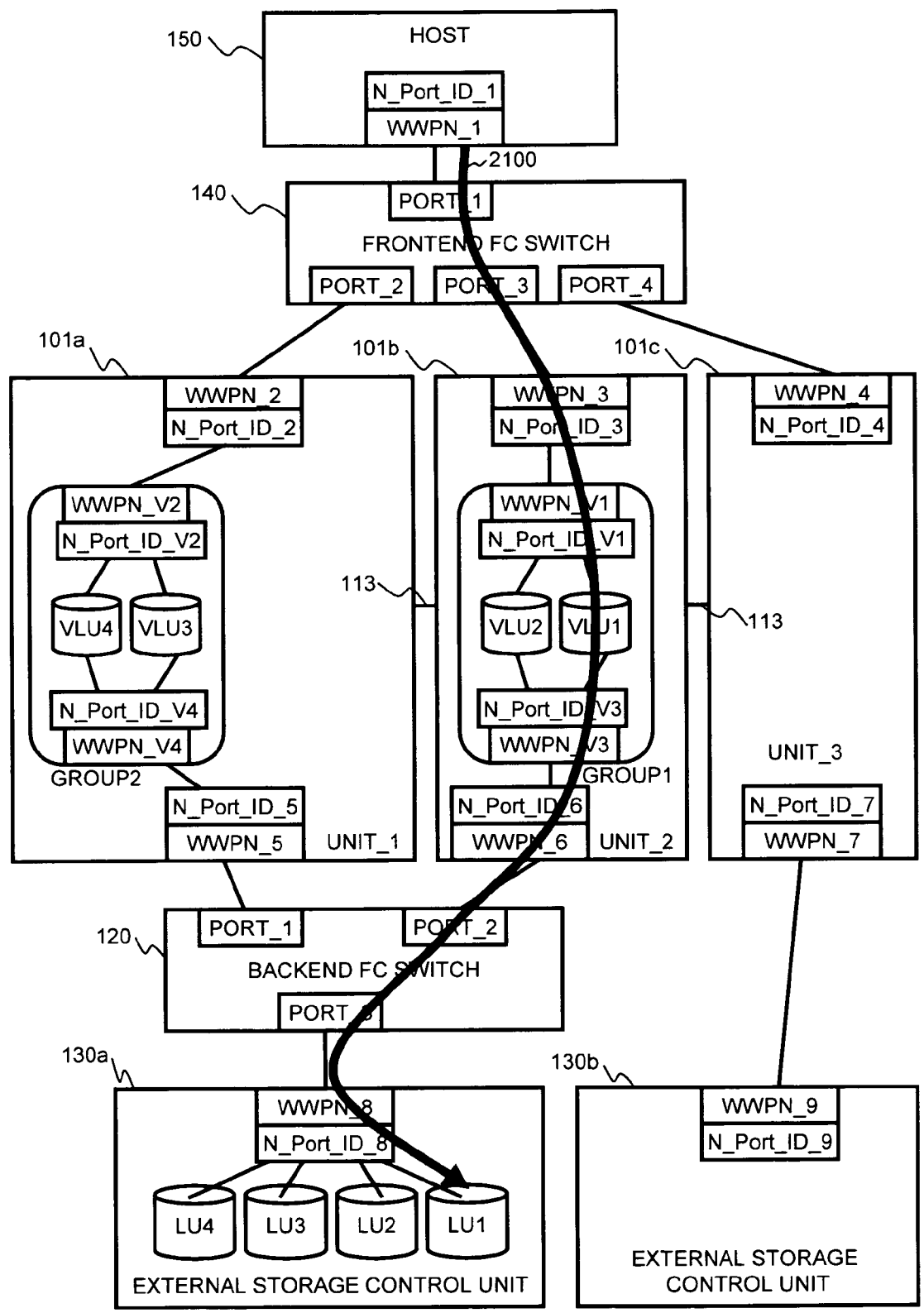
FIG. 20 Volume Accessing Path In Case That Both Frontend And Backend Virtual N_Port is Transferred to the Same Unit at the Same Time

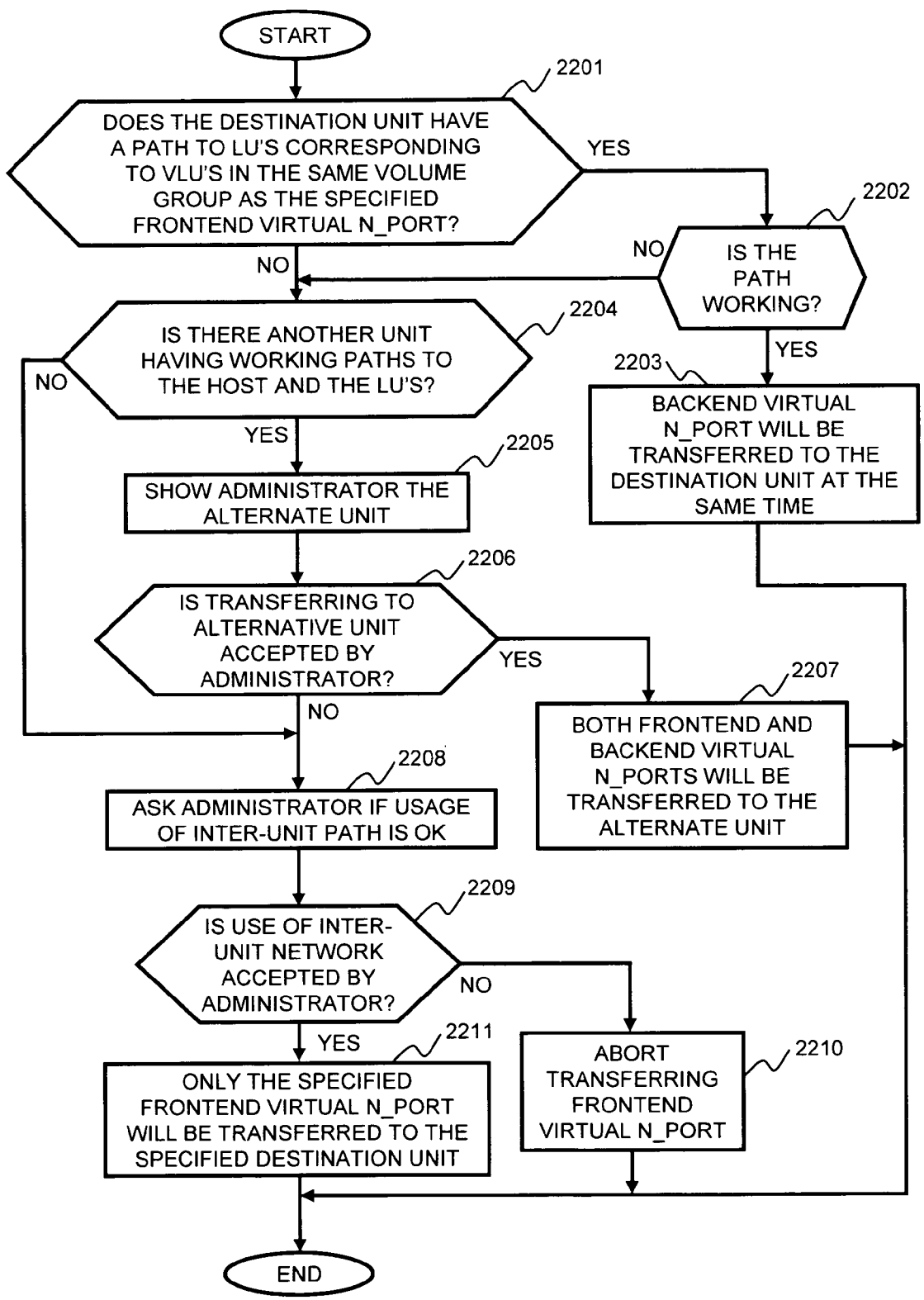
FIG. 21 Flowchart of Inspecting Use of Inter-Unit Path After Transfer (In Case That Target is Specified by Frontend Virtual N_Port)

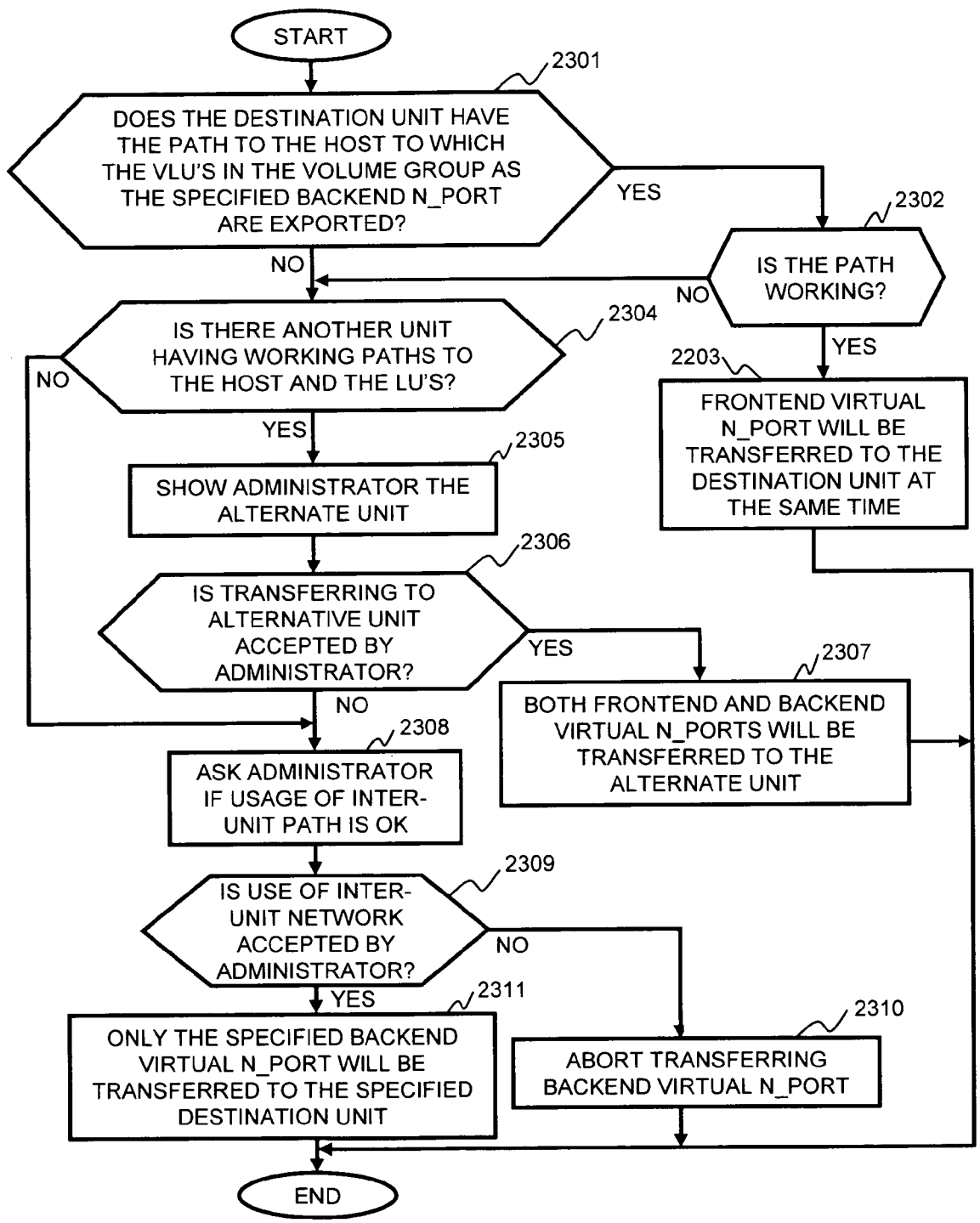
FIG. 22 Flowchart of Inspecting Use of Inter-Unit Path After Transfer (In Case That Target is Specified by Backend Virtual N_Port)

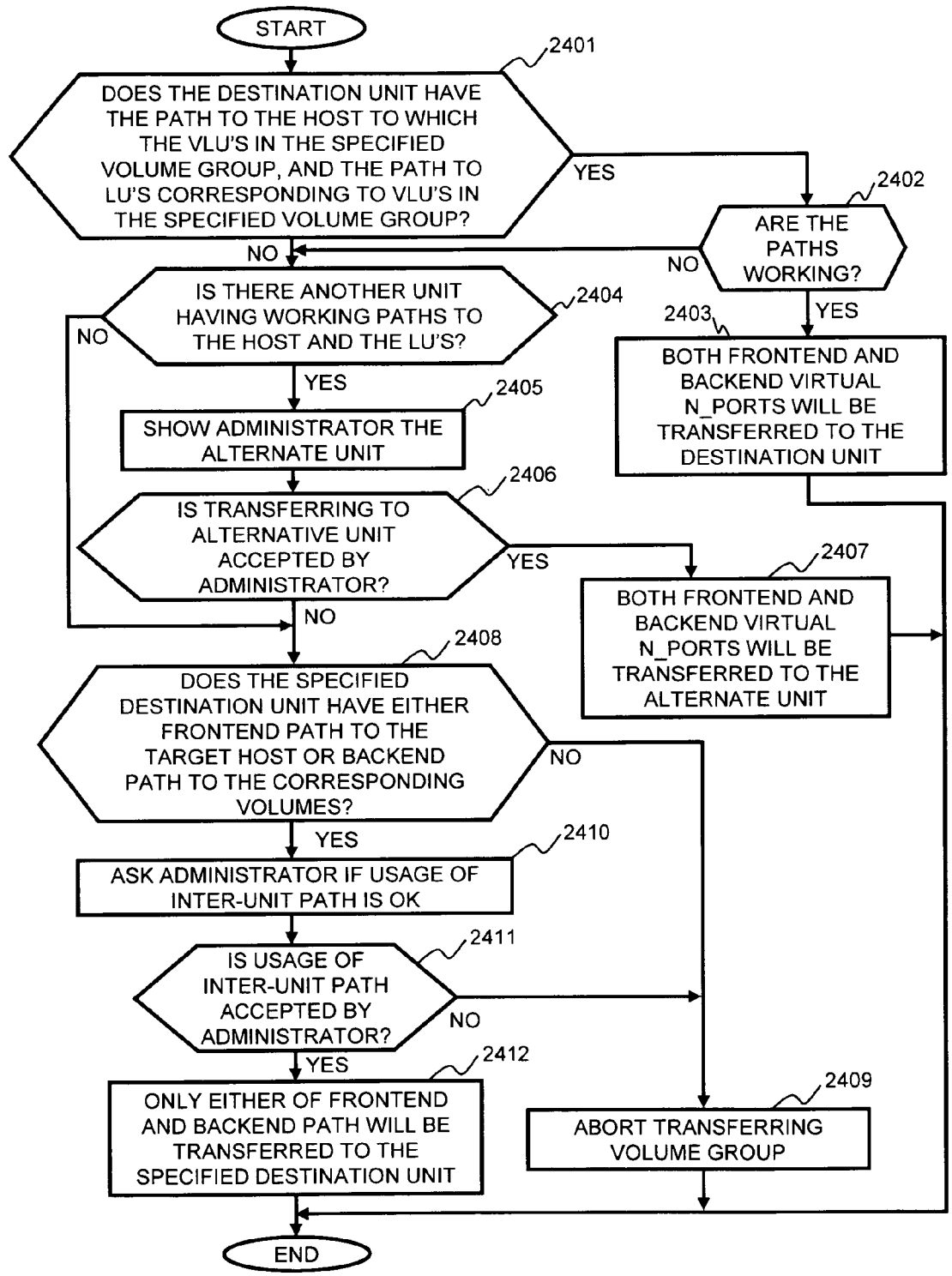
FIG. 23 Flowchart of Inspecting Use of Inter-Unit Path After Transfer (In Case that the Target is Specified by Volume Group)

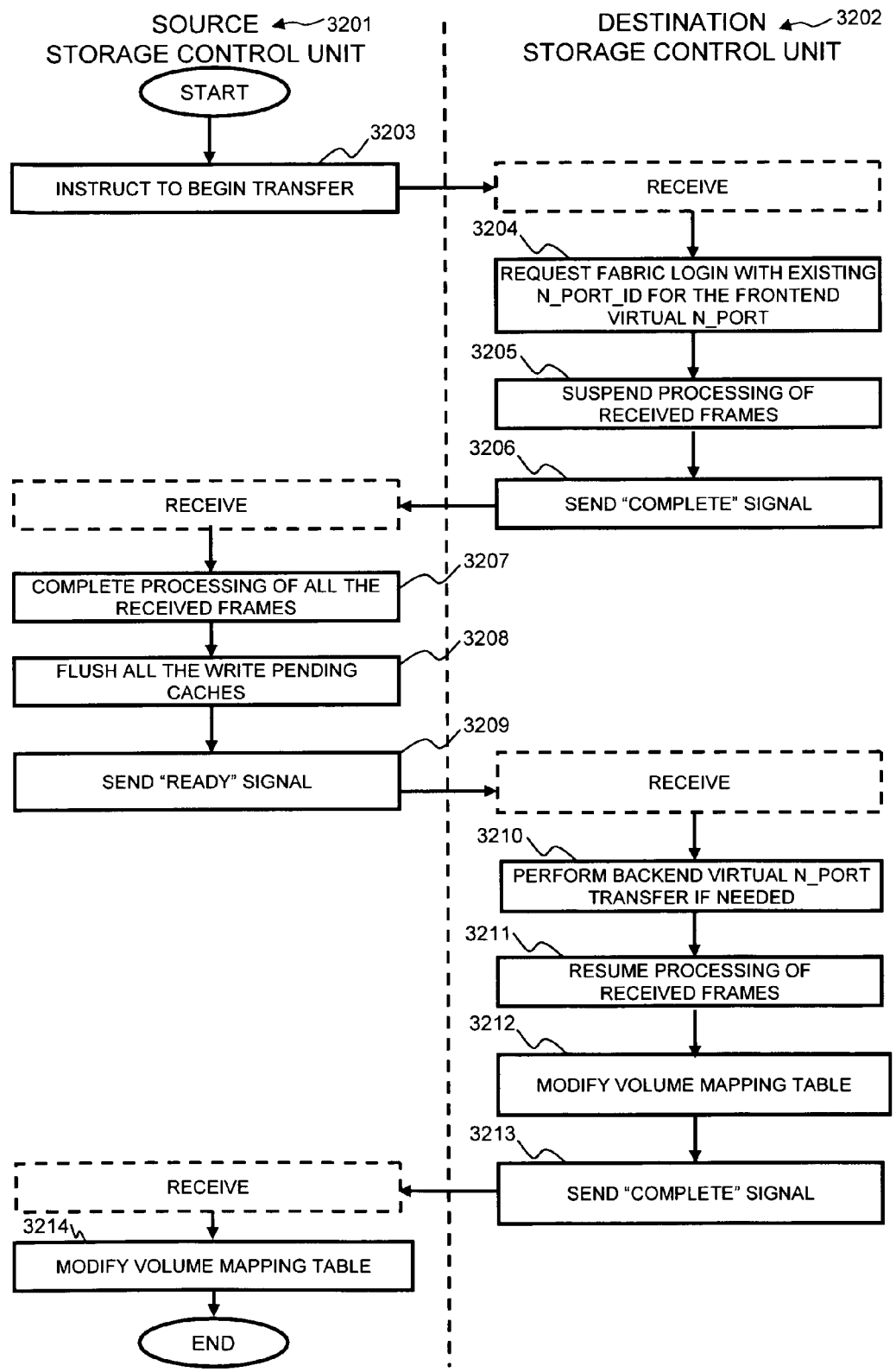
FIG. 24A Flowchart of Frontend Virtual N_Port Transfer

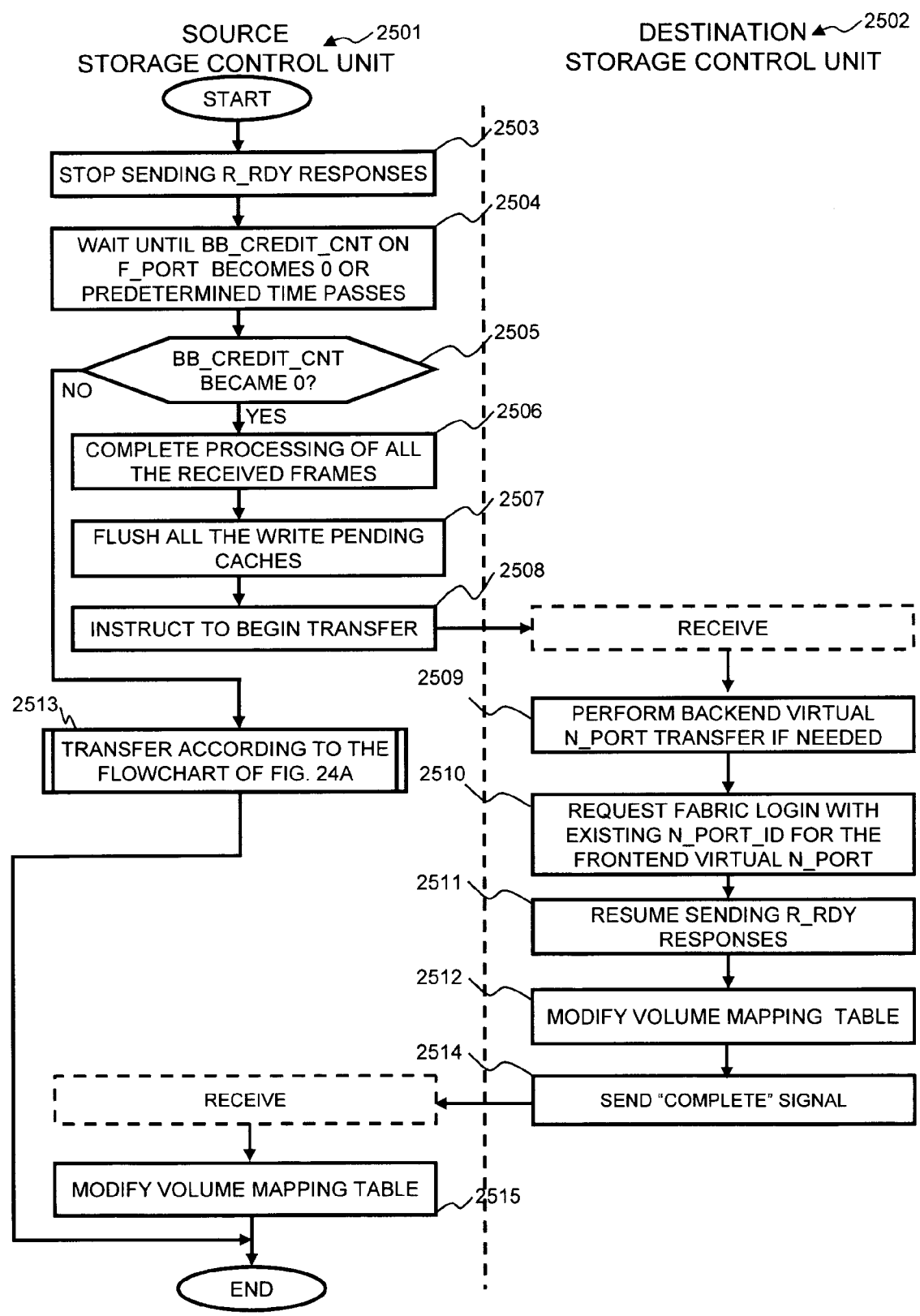
FIG. 24B Flowchart of Frontend Virtual N_Port Transfer (When Utilizing BB_Credit Flow Control)

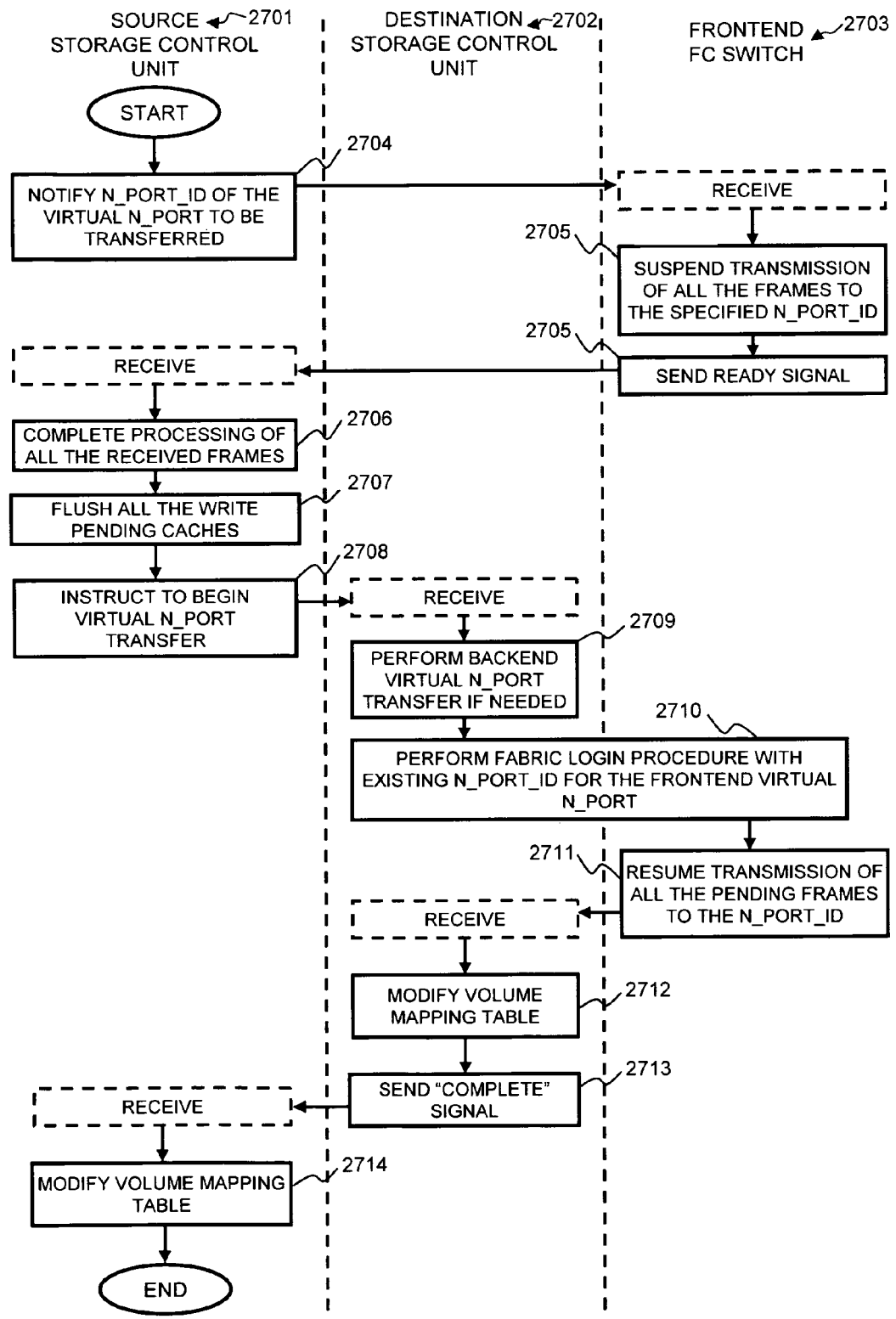
FIG. 24C Flowchart of Frontend Virtual N_Port Transfer (When Utilizing FC Switch Assistance)

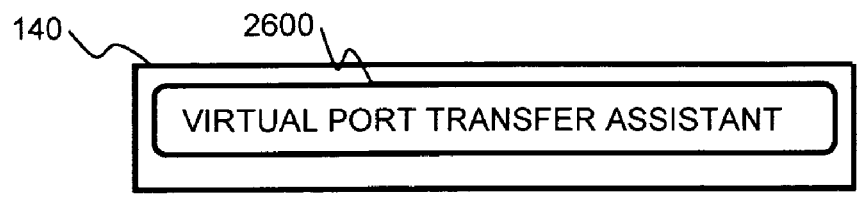
FIG. 25 Software Module Configuration of Frontend FC Switch
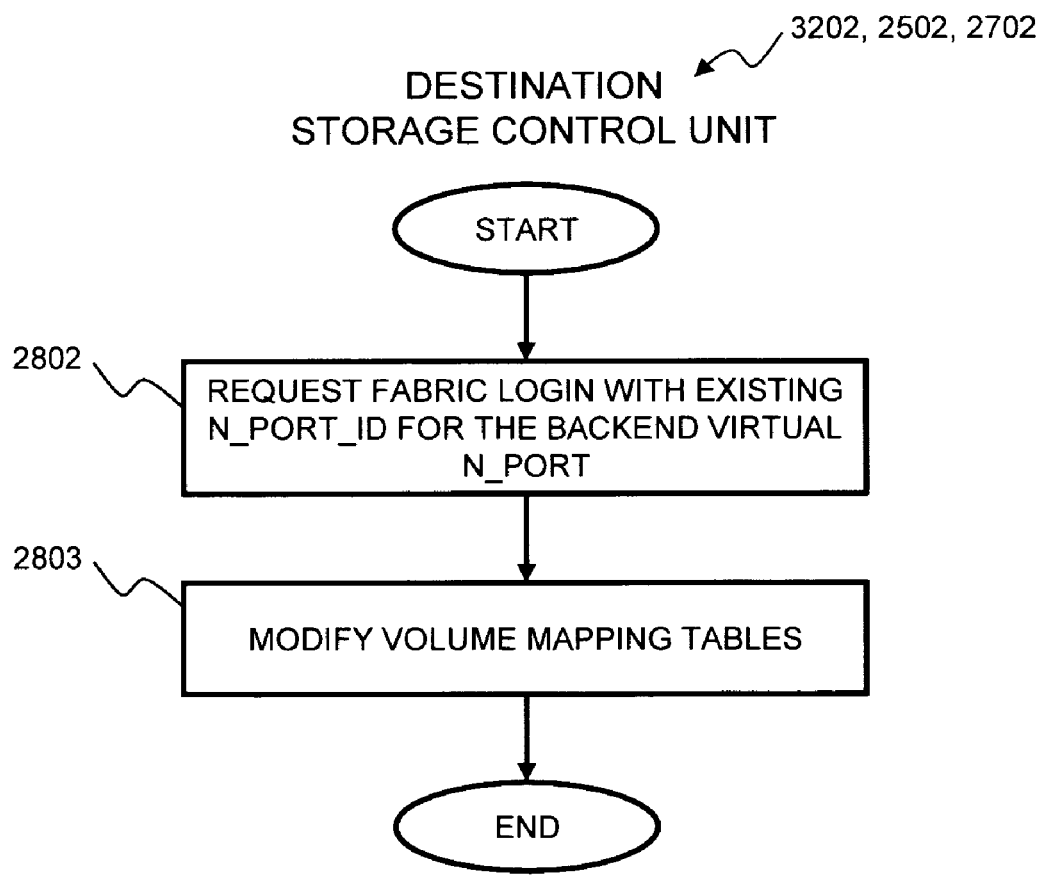
FIG. 26 Flowchart of Backend Virtual N_Port Transfer

FIG. 27A Example of Volume Group Mapping on Unit_1 Table After Transfer

503

| 1401 | 1402 | 1403 | 1404 | 1405 | 1406 | 1407 | 1408 | 1409 | 1410 | 1411 |
|---|---|---|---|---|---|---|---|---|---|---|
| VOLUME GROUP | TARGET HOST WWPN | EXPORTED VOLUME | EXTERNAL WWPN | EXTERNAL VOLUME | FRONTEND VIRTUAL WWPN | FRONTEND N_PORT_ID | BACKEND VIRTUAL WWPN | BACKEND N_PORT_ID | CURRENT FRONTEND PATH | CURRENT BACKEND PATH |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 |

FIG. 27B Example of Volume Group Mapping on Unit_2 Table After Transfer

503

| 1401 | 1402 | 1403 | 1404 | 1405 | 1406 | 1407 | 1408 | 1409 | 1410 | 1411 |
|---|---|---|---|---|---|---|---|---|---|---|
| VOLUME GROUP | TARGET HOST WWPN | EXPORTED VOLUME | EXTERNAL WWPN | EXTERNAL VOLUME | FRONTEND VIRTUAL WWPN | FRONTEND N_PORT_ID | BACKEND VIRTUAL WWPN | BACKEND N_PORT_ID | CURRENT FRONTEND PATH | CURRENT BACKEND PATH |
| GROUP3 | WWPN_1 | LU1, LU2 | - | - | WWPN_V5 | N_PORT_ID_V5 | - | - | WWPN_3 | - |
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_3 | WWPN_6 |

FIG. 27C Example of Integrated Volume Group Mapping on Management Host Table After Transfer

3303

| 1401 | 1402 | 1403 | 1404 | 1405 | 1406 | 1407 | 1408 | 1409 | 1410 | 1411 | 3401 |
|---|---|---|---|---|---|---|---|---|---|---|---|
| VOLUME GROUP | TARGET HOST N_PORT | EXPORTED VOLUME | EXTERNAL N_PORT | EXTERNAL VOLUME | FRONTEND VIRTUAL N_PORT | FRONTEND N_PORT_ID | BACKEND VIRTUAL N_PORT | BACKEND N_PORT_ID | CURRENT FRONTEND PHYSICAL N_PORT | CURRENT BACKEND PHYSICAL N_PORT | CURRENT UNIT |
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_3 | WWPN_6 | UNIT_2 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 | UNIT_1 |
| GROUP3 | WWPN_1 | LU1, LU2 | - | - | WWPN_V5 | N_PORT_ID_V5 | - | - | WWPN_3 | - | UNIT_2 |

1600

| F_PORT | N_PORT WWPN | ASSIGNED N_PORT_ID |
|---|---|---|
| PORT_1 | WWPN_1 | N_PORT_ID_1 |
| PORT_2 | WWPN_2 | N_PORT_ID_2 |
| PORT_3 | WWPN_3 | N_PORT_ID_3 |
| PORT_4 | WWPN_4 | N_PORT_ID_4 |
| PORT_3 | WWPN_V1 | N_PORT_ID_V1 |
| PORT_2 | WWPN_V2 | N_PORT_ID_V2 |
| PORT_3 | WWPN_V5 | N_PORT_ID_V5 |

FIG. 28 Example of Routing Table on Frontend FC Switch

1700

| F_PORT | N_PORT WWPN | ASSIGNED N_PORT_ID |
|---|---|---|
| PORT_1 | WWPN_5 | N_PORT_ID_5 |
| PORT_2 | WWPN_6 | N_PORT_ID_6 |
| PORT_3 | WWPN_8 | N_PORT_ID_8 |
| PORT_2 | WWPN_V3 | N_PORT_ID_V3 |
| PORT_1 | WWPN_V4 | N_PORT_ID_V3 |

FIG. 29 Example of Routing Table on Backend FC Switch

| VOLUME GROUP | TARGET HOST N_PORT | EXPORTED VOLUME | EXTERNAL N_PORT | EXTERNAL VOLUME | FRONTEND VIRTUAL N_PORT | FRONTEND N_PORT_ID | BACKEND VIRTUAL N_PORT | BACKEND N_PORT_ID | CURRENT FRONTEND PHYSICAL N_PORT | CURRENT BACKEND PHYSICAL N_PORT | CURRENT UNIT |
|---|---|---|---|---|---|---|---|---|---|---|---|
| GROUP1 | WWPN_1 | VLU1, VLU2 | WWPN_8 | LU1, LU2 | WWPN_V1 | N_PORT_ID_V1 | WWPN_V3 | N_PORT_ID_V3 | WWPN_2 | WWPN_5 | UNIT_1 |
| GROUP2 | WWPN_1 | VLU3, VLU4 | WWPN_8 | LU3, LU4 | WWPN_V2 | N_PORT_ID_V2 | WWPN_V4 | N_PORT_ID_V4 | WWPN_2 | WWPN_5 | UNIT_1 |
| GROUP3 | WWPN_1 | LU1, LU2 | - | - | WWPN_V5 | N_PORT_ID_V5 | - | - | WWPN_3 | - | UNIT_2 |

FIG. 30 Example of Integrated Volume Group Mapping Table

| PHYSICAL N_PORT | STATUS | REACHABLE N_PORT | UNIT |
| --- | --- | --- | --- |
| WWPN_2 | OK | WWPN_1 | UNIT_1 |
| WWPN_3 | OK | WWPN_1 | UNIT_2 |
| WWPN_4 | OK | WWPN_1 | UNIT_3 |
| WWPN_5 | OK | WWPN_8 | UNIT_1 |
| WWPN_6 | OK | WWPN_8 | UNIT_2 |
| WWPN_7 | OK | WWPN_9 | UNIT_3 |

FIG. 31 Example of Integrated Physical Path Management Table

US 7,849,265 B2

AVOIDING USE OF AN INTER-UNIT NETWORK IN A STORAGE SYSTEM HAVING MULTIPLE STORAGE CONTROL UNITS

BACKGROUND OF THE INVENTION

1. Field of the Invention

The present invention relates generally to information and storage systems and networks.

2. Description of Related Art

According to recent trends, there is a concept referred to as a "storage grid," in which a multiple distributed computing resources are put into operation to act as a single entity. Such storage grids are becoming more widely used in the storage industry. As one form of a storage grid, a configuration may be constructed in which a plurality of storage control units are arranged together and act as a single storage system. In such a configuration, multiple storage control units are connected to each other via an inter-unit network. The multiple storage control units exchange management information and data through the inter-unit network to enable them to function as a single storage system. However, a drawback to such a storage grid arrangement can occur when the inter-unit network itself is used to process input/output (I/O) requests from host computers. In particular, the processing performance of the I/O requests can be degraded when the inter-unit network has to be used to process an I/O request in comparison with the processing performance for an I/O request that is completed solely within one of the storage control units without using the inter-unit network.

Related art includes U.S. Pat. No. 6,779,083 B2, to Ito et al., entitled "Security for Logical Unit in Storage Subsystem", and U.S. patent application Ser. No. 11/826,717, to J. HARA et al., filed Jul. 18, 2007, entitled "Method and Apparatus for Managing Virtual Ports on Storage Systems", the entire disclosures of which are incorporated herein by reference. Related art also includes the Fibre Channel Standard and corresponding specification documents, such as are available from the InterNational Committee for Information Technology Standards (INCITS) Technical Committee T11 (e.g., t11.org). Especially, for example, documents relating to FC-FS (Fibre Channel Framing and Signaling), FC-DA (Fibre Channel Device Attach), FC-LS (Fibre Channel Link Services), FC-GS (Fibre Channel Generic Services), and FC-PH (Fibre Channel Physical and Signaling Interface) are related to this invention. For example, "Fibre Channel Framing and Signaling-3 (FC-FS-3), Project T11/1861-D Rev 0.20", Published by the American National Standards Institute, Inc. Jun. 29, 2007, the disclosure of which is incorporated herein by reference, describes the framing and signaling requirements for Fibre Channel links.

BRIEF SUMMARY OF THE INVENTION

The invention embodies storage systems comprising multiple storage control units and a storage area network (SAN) including the storage systems. The invention provides for avoiding communications between the storage control units when carrying out I/O processing so that I/O processing performance will not be degraded. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a hardware configuration of an information system in which the method and apparatus of the invention may be applied.

FIG. 2 illustrates a configuration including service processors.

FIG. 3 illustrates a hardware configuration of the host and management host.

FIG. 4 illustrates an exemplary hardware configuration of an FC switch.

FIG. 5A illustrates an exemplary software module configuration on the storage controller.

FIG. 5B illustrates an exemplary software module configuration on the management server.

FIG. 6 illustrates an exemplary data structure of a frame.

FIG. 7 illustrates a fabric login procedure for a physical N_Port

FIG. 8 illustrates a fabric login procedure for a virtual N_Port.

FIG. 9 illustrates an exemplary fabric login procedure for a virtual N_Port to re-use an existing N_Port_ID, or to specify an N_Port_ID from requesting party.

FIG. 10 illustrates a port login to a responder from a originator.

FIG. 11 illustrates an exemplary BB_Credit flow control mechanism.

FIG. 12 illustrates an exemplary EE_Credit flow control mechanism.

FIG. 13 illustrates an explanatory drawing of a port and volume configuration.

FIG. 14A illustrates an exemplary data structure of volume group mapping table on unit_1.

FIG. 14B illustrates an exemplary data structure of a volume group mapping table on unit_2.

FIG. 15A illustrates an exemplary data structure of a physical path management table on unit_1.

FIG. 15B illustrates an exemplary data structure of a physical path management table on unit_2.

FIG. 15C illustrates an exemplary data structure of a physical path management table on unit_3.

FIG. 16 illustrates an exemplary data structure of a routing table on a frontend FC switch.

FIG. 17 illustrates an exemplary data structure of a routing table on a backend FC switch.

FIG. 18 illustrates a volume accessing path before port transfer.

FIG. 19 illustrates a volume accessing path in the case that only the frontend virtual N_Port is transferred to another unit.

FIG. 20 illustrates a volume accessing path in the case that both the frontend and the backend virtual N_Port is transferred to the same unit at the same time.

FIG. 21 illustrates an exemplary flowchart of inspecting use of an inter-unit path after transfer in the case that the target is specified by frontend virtual N_Port.

FIG. 22 illustrates an exemplary flowchart of inspecting use of an inter-unit path after transfer in the case that the target is specified by backend virtual N_Port.

FIG. 23 illustrates an exemplary flowchart of inspecting use of an inter-unit path after transfer in the case that the target is specified by volume group.

FIG. 24A illustrates an exemplary flowchart of a frontend virtual N_Port transfer.

FIG. 24B illustrates an exemplary flowchart of a frontend virtual N_Port transfer utilizing BB_Credit flow control.

FIG. 24C illustrates an exemplary flowchart of a frontend virtual N_Port transfer utilizing FC switch assistance.

FIG. 25 illustrates an exemplary software module configuration of frontend FC switch.

FIG. 26 illustrates an exemplary flowchart of a backend virtual N_Port transfer.

FIG. 27A illustrates an exemplary data structure of a volume group mapping on Unit_1 table following transfer.

FIG. 27B illustrates an exemplary data structure of volume group mapping on Unit_2 table following transfer.

FIG. 27C illustrates an exemplary data structure of integrated volume group mapping on the management host table following transfer.

FIG. 28 illustrates an exemplary data structure of a routing table on the frontend FC switch.

FIG. 29 illustrates an exemplary data structure of a routing table on the backend FC switch.

FIG. 30 illustrates an exemplary data structure of an integrated volume group mapping table.

FIG. 31 illustrates an exemplary data structure of an integrated physical path management table.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Embodiments of the invention teach a storage system that includes a function for providing virtual ports. The storage system is able to transfer the virtual ports among physical ports on multiple storage control units making up the storage system. Also, the storage system is able to manage logical volumes, virtual volumes and virtual ports as a group. When an administrator instructs the storage system through a management server to transfer a virtual port, a logical volume, a virtual volume, or a group of virtual ports and volumes among the storage control units, the management server of the storage system determines whether the inter-unit network will be required to be used for communications between the multiple storage control units after the instructed transfer takes place when responding to I/O requests. When it is determined that the inter-unit network would be required to be used following the transfer, the management server of the storage system determines an alternate control unit that should be used, and presents this to the administrator so that the inter-unit network will not have to be used after the transfer takes place.

System Configuration

FIG. 1 illustrates an exemplary configuration of an information system in which the present invention may be applied. A storage system 100 is in communication with one or more host computers 150 via one or more frontend FC switches 140 and with a management server 160 and the hosts 150 via a LAN (local area network) 170. Storage system 100 is configured in a storage grid configuration and includes multiple storage control units 101, one or more backend FC switches 120, and one or more external storage control units 130. Each storage control unit 101 includes a CPU 102, a memory 103, a non-volatile random access memory (NVRAM) 104, a cache memory 105, a disk controller 106, a plurality of disk drives 107, multiple FC interface controllers 108, an Ethernet interface controller 110, and an inter-unit network controller 112. These components are connected to each other via an internal bus 111. Further, while three storage control units 101a-101c are illustrated, the invention is not limited to any particular number of storage control units.

CPU 102 administers the control of the storage control unit 101, while memory 103 stores programs executed by CPU 102. CPU 102 executes micro-programs stored in memory 103, so as to control disk interface controller 106, FC interface controller 108, Ethernet interface controller 106, and so on. Also, CPU 102 exchanges management information and data with the other storage control units 101 through inter-unit network controller 112 and inter-unit network 113 to enable the multiple storage control units 101 to function as a single storage system. Some of the programs realizing this invention may be executed by CPU 102 and may be stored on memory 103, or other computer readable medium.

NVRAM 104 is a nonvolatile memory which is able to preserve management information, even when power is off. Cache memory 105 serves to temporarily store data to be exchanged among FC interface controllers 108 and disk controller 106. Disk controller 106 exchanges data with disk drives 107 in accordance with instructions from CPU 102. CPU 102 controls disk drives 107 in a RAID (Redundant Array of Independent Disks) configuration (for example, RAID level 0, 1 or 5) via disk controller 106. In the RAID configuration, multiple disk drives 107 are managed as one group (hereinafter referred to as a RAID group). One or more logical volumes (i.e., logical units or LUs) are logically configured on each RAID group and serve as storage for the hosts 150. An identifier referred to as an LUN (Logical Unit Number) is assigned to each logical volume. RAID configuration information is stored in NVRAM 104, and is referred to by the CPU 102 when CPU 102 executes a data READ process or a data WRITE process. Additionally, it should be noted that the invention also may be configured to function without the disk controller 106 and disk drives 107, and the physical storage used by the storage system may be located in one or more external storage systems 130 in communication with the multiple storage control units 101.

One of FC interface controllers 108 is connected to frontend FC switch 140, and the other FC interface controller 108 is connected to backend FC switch 120 via optical fiber cables or a copper wire cables, or the like. Ethernet interface controller 110 is connected to host 150 and management server 160 via LAN 170. Inter-unit network controller 112 allows CPU 102 to exchange data and synchronize management information with CPUs 102 on the other storage control units 101. Storage control units 101 are connected to each other via inter-unit network 113 through inter-unit network controllers 112. High-speed connection interfaces such as PCI-Express, Infiniband, etc., are desirable for use in the inter-unit communications. However, more conventional network interfaces such as Fibre Channel, Ethernet, or the like, may also be used for this interface. In such a case, FC interface controller 108 or Ethernet interface controller 110 may be used as inter-unit network controller 112. In those embodiments, a SAN mediated by a frontend FC switch 140 or a backend FC switch 120, or LAN 170 or other network or communications link may be used as the inter-unit network 113.

Backend FC switch 120 mediates communication between storage control units 101 and external storage control units 130 conforming to the FC-SW (Fibre Channel Switched Fabric) standard. In general, a communication network established according to the FC-SW standard is referred to as a SAN (Storage Area Network). As illustrated in FIG. 4, FC switches 120, 140 typically include a CPU 401, a memory 402, an NVRAM 403, a cache memory 404, and a plurality of FC interface controllers 405. The invention may be arranged with one FC switch serving as both frontend FC switch 140 and backend FC switch 120 on the condition that the FC switch is able to mediate among hosts 150, storage control units 101, and external storage control units 130.

External storage control units 130 are connected to storage control units 101, and are managed by the storage control units 101. Each external storage control unit 130 comprises the same components as storage control unit 101. However, unlike storage control units 101, external storage control units 130 typically do not have a function to manage other storage control units. Some of the external storage control units 130 may be connected to the storage control units 101 via a SAN mediated by backend FC switch 120, as illustrated for external storage control unit 130a, and some external storage control units 130 may be connected directly to storage control units 101, as illustrated for external storage control unit 130b. Each of the storage control units 101 is able to present logical volumes (or logical units, LUs) created in external storage control unit 130 to appear to the hosts 150 as storage capacity that is presented to the hosts as being logical units created inside the storage control units 101, even though the actual storage capacity is managed by the external storage control unit 130. Thus, these LUs are virtual LUs because they exist only virtually in the storage control unit 101, and actually exist as LUs in the external storage control units 130. Hereafter, such virtual logical volumes are referred to as "virtual logical units" or "VLUs". To read data from or to write data to the external storage control unit 130, hosts 150 issue I/O (e.g., read/write) requests to the virtual logical units on storage control units 101, and the storage control units 101 convert the received I/O requests into I/O requests sent to the corresponding logical volumes in the external storage control units 130.

Frontend FC switch 140 establishes communication conforming to the FC-SW (Fibre Channel Switched Fabric) standard between hosts 150 and storage control units 101. The components of frontend FC switch 140 are the same as for backend FC switch 120, as illustrated in FIG. 4. Further, some of the programs realizing this invention can be run on frontend FC switch 140. This invention may be arranged with one FC switch serving as both frontend and backend FC switch 140 and 120.

Hosts 150 may be, for example, any of personal computers, work stations, mainframe computers, or the like. Hosts 150 execute application programs such as database programs, or the like, write processing results to one of storage control units 101 for storage in storage volumes, and utilize information resources stored therein. As illustrated in FIG. 3, a host 150 typically includes a CPU 301, a memory 302, a storage device 304, an FC interface controller 305, and an Ethernet interface controller 306. Host 150 is connected to storage control units 101 through FC interface controller 306 via a SAN mediated by frontend FC switch 140.

Management server 160 is connected to storage control units 101 via LAN 170. Management server 160 carries out, for example, configuration setting and operation information acquisition for storage control units 101, and brings together the acquired information. An administrator executes creation of logical volumes in storage control unit 101, allocation of logical volumes to hosts 150, zoning, and LUN masking setting through management server 160. To reduce the workload on management server 160 for acquiring information from storage control units 101, service processors 200 may be deployed for each storage control unit 101, as illustrated in FIG. 2. Some of the programs realizing this invention can be run on CPU 301 using memory 302 or other computer readable medium. LAN 170 is a local area network that is structured using Ethernet or other suitable medium in which data transmission using TCP/IP (Transmission Control Protocol/Internet Protocol) is carried out.

Software Modules

As illustrated in FIG. 5A, there are three kinds of software modules 501, 502, 505 in loaded in memory 103 of each storage control unit 101, and two kinds of management tables 503, 504 in stored in NVRAM 104 of each storage control unit 101. Volume group manager 501 manages mapping between VLUs on storage control unit 101 and LUs on external storage control units 130 using volume group mapping table 503 within each storage control unit 101. Volume group manager 501 also manages which hosts the VLUs are exported to, through which virtual N_Ports the VLUs are exported to the hosts and mapped to LUs, and on which physical N_Port the virtual N_Port is associated within each storage control unit 101 (the function and use of virtual and physical N_Ports is explained further below). Physical path manager 502 uses physical path management table 504 within each storage control unit 101 to manage which physical N_Ports reside on each storage control unit 101. Physical path manager also manages which hosts 150 or external storage control unit 130 each physical N_Port can be used to reach, and further manages the status of each physical N_Port. Transfer manager 505 receives instructions regarding transfer of virtual N_Ports, VLUs, or a group of virtual N_Ports and VLUs among storage control units 101 issued by management server 160, and initiates the transfer as instructed.

As illustrated in FIG. 5B, there are three kinds of software modules 3301, 3302, 3305 in memory 302 of management server 160 or other computer readable medium, and two kinds of management tables 3303, 3304 in memory 302 or storage device 304 of management server 160. Integrated volume group manager 3301 acquires the volume group mapping table 503 from each storage control unit 101, and integrates these acquired tables into integrated volume group mapping table 3303. Integrated physical path manager 3302 acquires physical path management table 504 from each storage control unit 101, and integrates these acquired tables into integrated physical path management table 3304. When an administrator instructs the transfer of virtual N_Ports, VLUs, or a group of virtual N_Ports and VLUs among storage control units 101, integrated transfer manager 3305 determines whether the inter-unit network 113 will be used if the transfer is carried out as instructed. When it is determined that the inter-unit network will be used after the transfer if carried out as instructed, integrated transfer manager 3305 determines and presents an alternate control unit to the administrator so that the inter-unit network will not be used after the transfer.

Fibre Channel Protocol

A device having a Fibre Channel interface is referred to as a "node", and a physical terminal corresponding to the interface is referred to as a "port". One node can have one or more ports. The number of ports that can simultaneously participate in an overall Fibre Channel system is an address number of a maximum of 24 bits, that is, $2^{24}$ (16,777,216). Hardware such as Fibre Channel (FC) switches that mediate these connections is referred to a "fabric" or "switching fabric". Each port on each node is called an "N_Port", and each port on each FC switch is called an "F_Port". In this description, host 150, storage control units 101, and external storage control units 130 are referred to as "nodes", an "N_Port" corresponds to each FC interface controller 108 on each node, and an "F_Port" corresponds to each FC interface controller on frontend FC switch 140 or backend FC switch 120. Thus, in the configuration of FIG. 1, the FC interface controllers 108 that are in communication with frontend FC switch 140 may be referred to as "frontend physical ports", while the FC interface controllers 108 that are in communication with backend FC switch 120 may be referred to as "backend physical ports". In the situation that there is only one FC switch that serves as both the frontend and backend FC switch, a single FC interface controller 108 may act as both the frontend and backend physical port through the use of multiple virtual ports assigned to each physical port, as will be explained further below, or multiple physical ports may be provided on each storage control unit for communication with the single FC switch.

Each of the nodes and N_Ports stores identification data that is unique worldwide, and that is assigned in accordance with predetermined rules by IEEE (Institute of Electrical and Electronics Engineers, Inc.), a standardization organization. Since this identification data is unique worldwide, it is called a "WWN" (World Wide Name) as an address capable of serving as a primary identifier for identifying a particular port. WWNs in an FC network are hardware-fixed addresses that are similar to MAC addresses that are used in Ethernet networks. There are two kinds of WWN addresses in an FC network, namely, an N_Port_Name and a Node_Name, each having an eight-byte size. N_Port_Name is a value (hardware address) unique to each port, and Node_Name is a value (hardware address) unique to each node. In the examples of the invention, the term "WWPN" (World Wide Port Name) represents an N_Port_Name.

When an N_Port is connected to a fabric, a unique ID within the fabric called N_Port_ID is assigned to each N_Port by the FC switch mediating the fabric. The FC switch routes transmissions among the nodes connect to the FC switch based on the N_Port_IDs. Fibre Channel protocol allows an N_Port to create additional WWPNs on it, and have additional N_Port_IDs assigned to each additional WWPN. This is a port virtualization feature that is call "N_Port_ID Virtualization" or "NPIV". The additional WWPNs are typically determined on each device automatically so that they will be unique worldwide. To clarify between WWPNs as hardware address and WWPNs as additional address created dynamically, this description will use the terms "physical WWPN" and "physical N_Port" for WWPN as hardware addresses, and the terms "virtual WWPN" and "virtual N_Port" for WWPNs created dynamically as additional addresses on a physical N_Port.

In Fibre Channel protocol, communication is executed by information at a signal level referred to as an "Ordered Set" and using logical information having a fixed format referred to as a "frame". Basically, an I/O request originator initiates an I/O process by transmitting one or more frames, and a responder acts in response to the received frames. In this invention, in the SAN mediated by frontend FC switch 140, hosts 150 correspond to originators, and storage control units 101 correspond to responders. On the other hand, in the SAN mediated by backend FC switch 120, storage control units 101 correspond to originators, and external storage control units 130 correspond to responders.

FIG. 6 illustrates a structure of a frame. Each frame 601 has 4-byte identification data representing the start of the frame and called "SOF" (Start Of Frame) 602, a 24-byte frame header 603 characterizing control of a link operation and the frame, a data field 604 as a data part, which is the object to be practically transferred, a 4-byte cyclic redundancy code (CRC) 605, and a 4-byte identification data called "EOF" (End Of Frame) 606 which represents the end of the frame. The data field 604 is variable within 0 to 2,112 bytes. With respect to the structure of frame header 603, explanation will be given on only D_ID 608, S_ID 609, SEQ_ID 610, and SEQ_CNT 611 in the frame header 603. D_ID (Destination ID) 608 and S_ID (Source ID) 609 are 3-byte address identification data for identifying the N_Port receiving the frame and the N_Port transmitting the frame respectively, and have values effective for all the frames to be transmitted and received. FC_PH (Fibre Channel Physical and Signaling Interface) Standard, as one of the standard sets of the Fibre Channel standard, stipulates that the fabric allocates D_ID 608 and S_ID 609 during the initialization procedure which is called "fabric login". Detailed description of fabric login will be made later. SEQ_ID 610 (Sequence ID) is a unique identifier for the sequence of each frame. Here, a sequence is a group of frames that consists a transaction between an originator and a responder. SEQ_CNT (Sequence Count) 611 is a number of the frame within the sequence. A responder can identify the sequence to which the frame belongs, by referring to SEQ_ID 610, and sort the frames received within each sequence referring SEQ_CNT 611.

Next, the differences between classes of services that may be provided are described. In Fibre Channel protocol, different classes of service are defined to meet various application needs. For instance, both Class-2 and Class-3 are defined for the FC-SW (Fibre Channel Switching) standard. In Class-2, a responder returns acknowledgement of each frame to the originator; however, in Class-3, the responder does not return acknowledgement of frames received. Detailed explanation about acknowledgement of frames will be made later.

Fabric Login Procedure for Physical N_Port

To participate in a fabric, all the N_Ports to be connected to a fabric need to initially perform a fabric login. Through the fabric login, the FC switch assigns an N_Port_ID to each N_Port, and then establishes routing information for the N_Port on the FC switch. The login procedure used for physical N_Ports is slightly different from the login procedure used for virtual N_Ports.

FIG. 7 illustrates the exchange of information between a physical N_Port 701 on a node and an F_Port 702 on an FC switch. Typically, this login procedure is carried out when a physical N_Port is first physically connected to an F_Port on an FC switch. First, as illustrated in step 703, physical N_Port 701 transmits a FLOGI frame containing a fixed D_ID (0xFFFFFE) 608, fixed S_ID (0x000000) 609, and N_Port_Name (physical WWPN) and Node_Name of the physical N_Port 701. Then, in step 704, FC switch having the F_Port 702 determines the N_Port_ID to be used for the WWPN of the physical N_Port 701 based on the FC-PH standard. After determining the N_Port_ID, in step 705, the FC switch having the F_Port 702 establishes routing information for the N_Port_ID, and sends back the determined N_Port_ID to the physical N_Port 701. After receiving the N_Port_ID, physical N_Port 701 regards the received N_Port_ID as its own N_Port_ID, and transmits a PLOGI frame with its own N_Port_ID as S_ID 609, N_Port_Name (physical WWPN) and Node_Name to the F_Port 702. In response to that, the FC switch having the F_Port 702 sends back a list of D_IDs (N_Port_IDs), N_Port_Names (both physical and virtual WWPNs) and Node_Names of all the other accessible N_Ports logged on in the fabric. Through this procedure, equipment having the N_Port 701 is able to acquire the correspondence between N_Port_ID and N_Port_Name (i.e., both physical and virtual WWPNs) for each N_Port on the fabric.

N_Port_ID Virtualization and Fabric Login for Virtual N_Port

As part of the Fibre Channel protocol, N_Port_ID Virtualization (NPIV) is defined. This feature allows a physical N_Port to have multiple virtual N_Ports created on it. A virtual WWPN for each virtual N_Port is determined on each N_Port, and additional login procedure for each virtual WWPN is performed to acquire the N_Port_ID for each virtual WWPN by transmitting the login request through the physical N_Port that has previously logged in to the fabric using the procedure of FIG. 7.

FIG. 8 illustrates the exchange of information between a virtual N_Port 801 and an FC switch having an F_Port 702. The procedure illustrated in FIG. 8 is performed via physical N_Port associated with the virtual WWPN for which the fabric login procedure illustrated in FIG. 7 is previously performed. The procedure itself is almost the same as the fabric login procedure for physical N_Port illustrated in FIG. 7. However, as illustrated in step 803, an FDISC request is used instead of an FLOGI request is used for virtual WWPN so that FC switch having F_Port 802 can determine that the fabric login request sent from N_Port is for a virtual WWPN. Then, in step 804, the FC switch having the F_Port 802 determines the N_Port_ID to be used for the virtual WWPN of the virtual N_Port 801 based on the FC-PH standard. After determining the N_Port_ID, in step 805, the FC switch having the F_Port 702 establishes routing information for the N_Port_ID, and sends back the determined N_Port_ID to the virtual N_Port 801. After receiving the N_Port_ID, virtual N_Port 801 regards the received N_Port_ID as its own N_Port_ID, and transmits a PLOGI frame with its own N_Port_ID as S_ID 609, N_Port_Name (virtual WWPN) and Node_Name to the F_Port 802. In response to that, the FC switch having the F_Port 802 sends back a list of D_IDs (N_Port_IDs), N_Port_Names (both physical and virtual WWPNs) and Node_Names of all the other accessible N_Ports logged on in the fabric.

Re-Use of Previously Assigned N_Port_IDs

Currently, there is no protocol defined in Fibre Channel protocol for re-using a previously assigned N_Port_ID, or for requesting a specific N_Port_ID from FC switch by an N_Port. However, a method of implementing such a function is modeled herein that is similar to the transfer of an IP address between physical ports having different MAC addresses in a TCP/IP network by corresponding the N_Port_ID in an FC network to an IP address in a TCP/IP network. In TCP/IP, an IP address can be transferred between physical ports having different MAC addresses, and then the IP address can be re-used so that client hosts can access the services exported through the IP address without changing configuration on the client hosts, even in the case where the IP address is transferred to another physical port having a different MAC address. In TCP/IP, the ARP command is used to notify network switches that the IP address is to be transferred to another physical port. In response to the command, the network switches change routing information for the IP address.

In this invention, as in a TCP/IP network, it is assumed that the virtual N_Port can issue a request to use a existing N_Port_ID, i.e., an N_Port_ID assigned through a fabric login procedure performed beforehand, such as using the procedure set forth in FIG. 8. As an example, an FDISC command is assumed to use to notify the FC switch that the virtual N_Port is to be transferred to another physical N_Port.

FIG. 9 illustrates example of a fabric login procedure for a virtual N_Port 901 to re-use an existing N_Port_ID or to request a specific N_Port_ID for the virtual N_Port from an FC switch having F_Port 902. In step 903, the virtual N_Port sends an FDISC request with the existing N_Port_ID set in S_ID field 608. In response to the request, in step 904, FC switch having F_Port 902 checks whether the N_Port_ID has been previously assigned to the same virtual WWPN by checking the routing information in the FC switch. If the N_Port_ID has not been previously assigned to the virtual WWPN of the requesting virtual N_Port, then in step 905, FC switch having F_Port 902 checks whether the N_Port_ID is being used for (i.e., already assigned to) another WWPN. If the N_Port_ID is already assigned to another WWPN, then in step 906, FC switch having F_Port 902 rejects the request. On the other hand, when the N_Port_ID has previously been assigned to the same virtual WWPN, or if the requested N_Port_ID has not yet been assigned to another WWPN, then in step 907, FC switch having F_Port 902 changes routing information for N_Port_ID in its own routing information, and in step 908, FC switch having F_Port 902 sends back the same N_Port_ID to virtual N_Port 902 to provide notification that the request was accepted.

Node Login Procedure

In Fibre Channel protocol, before an originator starts sending frames to a responder, the N_Port of originator needs to login to the N_Port of the responder using a procedure called port login. FIG. 10 illustrates the exchange of information between the originator N_Port 1001 and the responder N_Port 1002. This procedure is the same for both physical N_Ports and virtual N_Ports. First, in step 1003, originator N_Port 1001 transmits a PLOGI frame 1003 to responder N_Port 1002. This request contains the N_Port_Name (physical WWPN or virtual WWPN), Node_Name, S_ID and other information of the originator N_Port 1001. After receiving the PLOGI request, responder N_Port 1002 saves the information contained in the request. When approving the request, responder N_Port 1002 transmits a frame called "ACC" 1004 to the originator N_Port 1001. When rejecting the request, responder N_Port 1002 transmits a frame called "LS_RJT" 1005 to the originator N_Port 1001. When the originator N_Port receives a response including the ACC frame in response to the PLOGI frame, the originator N_Port 1001 now knows that login was successful, and can start sending I/O requests to the responder N_Port 1002. However, if the originator receives an LS_RJT frame, then the originator N_Port 1001 knows that the login was not established, and that sending I/O requests to the responder N_Port 1002 is not allowed.

Flow Control Mechanism in Fibre Channel Protocol

As explained above, communication based on Fibre Channel protocol is performed using "frames". On each of the N_Ports and F_Ports, frames that are received are stored temporarily in reception buffers, assembled into their proper sequence, and delivered to the upper layer protocol. If the destination port does not have sufficient reception buffers to store received frames, the frames may be lost. To avoid such situations, two types of flow control mechanism are defined in the Fibre Channel Standard, namely, Buffer-to-Buffer flow control (hereafter referred to as "BB_Credit") and End-To-End flow control (hereafter referred to as "EE_Credit").

BB_Credit is a flow control mechanism between adjacent ports, typically between an N_Port and F_Port. With BB_Credit, notification of the number of reception buffers of the opponent port (BB_Credit_CNT), and notification of buffer release (R_RDY) are conducted between transmitting and destination ports. FIG. 11 illustrates an example of the BB_Credit mechanism. In the case illustrated in FIG. 11, both a transmitting port 1101 and a destination port 1102 have four 2 KB reception buffers 1104, 1106, and a transmission buffer 1105, 1107, respectively. Therefore, BB_Credit_CNT 1103, 1108 equals 4 on each port 1101, 1108 right after the fabric login procedure is completed. When transmitting port 1101 sends a frame 601 to destination port 1102, transmitting port 1101 decrements its own BB_Credit_CNT 1103. When transmitting port 1101 receives a R_RDY signal 1109 from destination port 1102, transmitting port 1101 increments its own BB_Credit_CNT. The R_RDY signal 1109 is sent from destination port 1102 when an empty buffer becomes available on destination port 1102. If BB_Credit_CNT becomes 0 on transmitting port 1101, transmitting port 1101 suspends sending frames 601, and waits until an R_RDY signal 1109 is sent from destination port 1102. If a certain amount of time (called E_D_TOV) has passed since transmitting port 1101 last received an R_RDY signal 1109, transmitting port 1101 treats the transmission as if it failed, and transmitting port 1101 tries to re-send the same frame 601, or aborts sending frames 601 and reports that to the upper layer protocol. The default value of E_D_TOV is typically 10 seconds. The BB_Credit process is used in both Class-2 and Class-3 levels of service.

As illustrated in FIG. 12, EE_Credit is a flow control mechanism between an originator 1201 and a responder 1202. The procedure for EE_Credit is almost the same mechanism as the BB_Credit mechanism described above. However, the notification of the number of reception buffers (EE_Credit_CNT) to each other is done during the port login procedure (described above with respect to FIG. 10). Also, ACK signals 1209, 1210 are used to notify the originator 1201 of resource availability on responder 1202, and a single ACK signal 1210 is able to represent availability of multiple buffers as illustrated in ACK_N 1210. Thus, both originator transmitting port 1201 and responder destination port 1202 have four 2 KB reception buffers 1204, 1206, and a transmission buffer 1205, 1207, respectively. Therefore, count 1203, 1208 equals 4 on each port right after the port login procedure is completed. When an originator 1201 sends a frame 601 to a responder 1202, the originator 1201 decrements its own EE_Credit_CNT 1203. When the originator 1201 receives an ACK signal 1209, 1210 from the responder 1202, the originator 1201 increments its own EE_Credit_CNT 1203 by the number indicated in the ACK signal 1209, 1210. EE_Credit is used only in Class-2 level of service.

Management Tables

FIG. 13 is an illustrative drawing of a possible configuration of ports and logical volumes according to the invention. This configuration is one example of many possible configurations, and is used to explain further details of the invention. Physical WWPNs are represented with a name of "WWPN_#" (# is replaced with numbers for individual ports), and the N_Port_ID assigned to a physical WWPN is represented with a name of "N_Port_ID_#". Virtual WWPNs are represented with a name of "WWPN_V#" (# is replaced with numbers for individual virtual ports), and N_Port_ID assigned to a virtual WWPN is represented with a name of "N_Port_ID. V#". For example, FC interface controller 305 (an N_Port) on host 150 is connected to one of the FC interface controllers 405 (an F_Port named "Port_1") on frontend FC switch 140, and has "WWPN_1" as its physical WWPN and "N_Port_ID_1" assigned to it by frontend FC switch 140 as its N_Port_ID. Also, FC interface controller 108 on storage control unit 101a is connected to F_Port named "Port_2" on frontend FC switch 140, and has "WWPN_2" as its physical WWPN and "N_Port_ID_2" assigned to it by frontend FC switch 140 as its N_Port_ID. Also, storage control unit 101a has "WWPN_V2" as a virtual WWPN and "N_Port_ID_V2" assigned to this virtual WWPN as its N_Port_ID by frontend FC switch 140. Virtual WWPN WWPN_V2 is currently associated with physical N_Port WWPN_2.

As illustrated in FIG. 13, storage control unit 101a has a unique ID of "unit_1", storage control unit 101b has a unique ID of "unit_2", and storage control unit 101c has a unique ID of "unit_3". Also, it is assumed that external storage control unit 130a exports four LUs 135 (LU1 to LU4) through WWPN_8, and storage control unit 101a manages and exports these LUs to host 150 as virtual LUs 133, namely VLU1 for LU1, VLU2 for LU2, VLU3 for LU3, and VLU4 for LU4. What is more, VLU1 and VLU2 are exported through virtual port WWPN_V1 and mapped to LU1 and LU2 using virtual port WWPN_V3. Similarly, VLU3 and VLU4 are exported to hosts 150 through virtual port WWPN_V2 and mapped to LU3 and LU4 using virtual port WWPN_V4.

As an example, when the physical port having WWPN of WWPN_1 on host 150 accesses data stored in LU1 on external storage control unit 130a, port WWPN_1 sends a frame 601 containing an I/O request with "N_Port_ID_1" as S_ID 609 and "N_Port_ID_V1" as D_ID 608. After receiving the frame, storage control unit 101a sends a frame 601 containing a converted I/O request with "N_Port_ID_V3" as S_ID 609 and "N_Port_ID_8" as D_ID 608. In response to the request, external storage control unit 130a returns a frame 601 containing the response with "N_Port_ID_8" as S_ID 609 and "N_Port_ID_V3" as D_ID 608. After receiving the frame, storage control unit 101a sends a frame 601 containing a converted response with "N_Port_ID_V1" as S_ID 609 and "N_Port_ID_1" as D_ID 608.

Volume Group Mapping Table

FIGS. 14A-14B illustrate examples of volume group mapping tables 503, which are maintained on each storage control unit 101. The values in FIGS. 14A-14B represent the state illustrated in FIG. 13, with FIG. 14A representing the state of volume and virtual port groups (hereafter "volume groups") "group1" and "group2" illustrated in control unit 101a, and FIG. 14B representing the state of "group3" illustrated in storage control unit 101b. Volume group 1401 is an arbitrary unique name of a group of logical volumes and virtual N_Ports. Target host N_Port 1402 is the WWPN of the N_Port on host 150 to which the logical volumes in the group are exported. Exported volume 1403 provides identifiers of logical volumes within storage control unit 101 that are exported to the target host port. External N_Port 1404 is the WWPN of the N_Port on the external storage control unit 130 in which the actual LUs corresponding to each exported volume 1403 reside. Null is set in this field if logical volumes 1403 correspond to LUs created inside storage control unit 101 instead of in an external storage control unit 130. External volume 1405 provides identifiers of LUs on external storage control unit 130 corresponding to exported volumes 1403. Null is set in this field if the exported volumes 1403 correspond to LUs inside storage control unit 101 instead of in an external storage control unit 103. Frontend virtual N_Port 1406 is the WWPN of the virtual N_Port that is used to export the exported volumes 1403 to host 150. Frontend N_Port_ID 1407 is the N_Port_ID assigned to the frontend virtual WWPN 1406. Backend virtual N_Port 1408 is the WWPN of the virtual N_Port that is used to access external storage control unit 130. Null is set in this field if the exported volumes 1403 correspond to LUs inside storage control unit 101 instead of in an external storage control unit 130. Backend N_Port_ID 1409 is the N_Port_ID assigned to the backend virtual WWPN 1408. Null is set in this field if the exported volumes 1403 correspond to LUs inside storage control unit 101 instead of in an external storage control unit 130. Current frontend physical N_Port 1410 is the WWPN of the physical N_Port that is currently associated with the frontend virtual WWPN 1406, i.e., the WWPN of the physical N_Port through which N_Port_ID for the frontend virtual WWPN 1406 is acquired. Current backend physical N_Port 1411 is the WWPN of the physical N_Port that is currently associated with the backend virtual WWPN 1406, i.e., the WWPN of the physical N_Port through which the N_Port_ID for the backend virtual WWPN 1408 is acquired. Null is set in this field if the exported volume 1403 corresponds to LUs inside storage control unit 101 instead of in an external storage control unit 130.

Physical Path Management Table

FIGS. 15A-15C illustrates examples of physical path management tables 504. The values in FIGS. 15A-15C represent the state illustrated in FIG. 13, where FIG. 15A illustrates the configuration of storage control unit 101a, FIG. 15B illustrates the configuration of storage control unit 101b, and FIG. 15C illustrates the configuration of storage control unit 101c. Physical N_Port 1501 is the WWPN of physical N_Port that can be used to access hosts 150 or external storage control units 130. Status entry 1502 indicates the status of the physical N_Port 1501. "OK" indicates that the N_Port is working properly, and "ERROR" indicates that the N_Port is not working because of some failure. Reachable N_Port 1504 is a list of WWPNs of N_Ports (i.e., other physical ports) that the physical N_Port 1501 is able to reach. This information can be acquired when the physical N_Port 1501 performs the fabric login procedure illustrated in FIG. 7 (more specifically, at step 708).

Integrated Volume Group Mapping Table

FIG. 30 illustrates an example of an integrated volume group management table 3303. Most of the columns are the same as for the volume group mapping tables 503 described above with reference to FIGS. 14A-14B. However, integrated volume group management table includes an additional column, current unit 3401, that indicates which unit the volume group 1401 currently resides on.

Integrated Physical Path Management Table

FIG. 31 illustrates an example of an integrated physical path management table 3304. Most of the columns are the same as for the physical path management tables 504, as described above with respect to FIGS. 15A-15C. However, integrated physical path management table 3304 includes an additional column, unit 3501, that indicates which unit the physical N_Port 1501 resides on.

Example of Routing Tables on FC Switches

FIG. 16 illustrates an example of a routing table 1600 on frontend FC switch 140, and FIG. 17 illustrates an example of a routing table 1700 on backend FC switch 120. The values in routing table 1600 in FIG. 16 and routing table 1700 in FIG. 17 represent the state of the information system illustrated in FIG. 13. In routing tables 1600, 1700, F_PORT 1601, 1701 list the identifiers of each F_Port that resides on the FC switch 140, 120, respectively. N_Port WWPN 1602, 1702 is the WWPN of the physical or virtual N_Port that is connected to the F_Port 1601, 1701, respectively. Assigned N_Port_ID 1603 and 1703 is the N_Port_ID assigned to the WWPN of the physical or virtual N_Port that is connected to the F_Port 1601, 1701, respectively. By maintaining a routing table on each of FC switches 140 and 120, each FC switch can identify through which port a frame received from an originator should be transferred. For example, a frame sent from the N_Port on host 150 to the virtual N_Port "WWPN_V1" on storage control unit 101a contains "N_Port_ID_V1" in the D_ID field 608. Frontend FC switch 140 can determine that the frame should be transferred through F_Port with identifier "port_2" by referencing the 5th row 1610 of the routing table 1600 illustrated in FIG. 16.

Flowchart of Inspecting Use of Inter-Unit Path after Transfer

On management server 160, an administrator instructs the transfer of a volume group or virtual N_Port among storage control units 101 so that load of processing I/O requests from host 150 will be more balanced among storage control units 101. However, if only the frontend virtual N_Port being accessed is transferred to another storage control unit 101, I/O requests to external storage control unit 130 will need to be transferred among storage control units 101 using the inter-unit network 113. Thus, even if a high-speed network interface is used for the inter-unit network controller 112, processing performance of I/O requests will be degraded compared with the case where there is no need to transfer requests among storage control units 101 (i.e., in the case where the processing of requests can be completed within a single storage control unit 101). Also, there may be an unnecessary increase in the processing loads on storage control units 101 because of the necessity of transferring the I/O requests between the storage control units 101.

For example, FIG. 18 illustrates the accessing path from host 150 to LU1 on external storage control unit 130a in the state illustrated in FIG. 13. If frontend virtual N_Port with WWPN_V1 is transferred to storage control unit 101c (named "unit_3") as illustrated in FIG. 19, I/O requests sent to WWPN_V1 will need to be transferred to storage control unit 101a (unit_1) using inter-unit network 113, so as to access VLU1, and thereby access LU1 through WWPN_V3 and WWPN_8. Actually, in the case of FIG. 19, transferring backend virtual N_Port with WWPN_V3 to storage control unit 101c is not possible because there is no direct path to the LU1 on the external storage control unit 130a from storage control unit 101c. However, as illustrated in FIG. 20, if frontend virtual N_Port with WWPN_V1 is transferred to storage control unit 101b, which does have a path to the external storage control unit 130a, the backend virtual N_Port with WWPN_V3 should also be transferred to storage control unit 101b at the same time so as to avoid degradation of processing performance caused by the use of inter-unit network 113.

Following the flowcharts illustrated in FIGS. 21-23, management server 160, according to this invention, inspects whether an inter-unit path will be used after a virtual port or volume group is transferred to another unit as instructed by administrator. If an inter-unit path will need to be used after the transfer, then management server 160 automatically determines a more appropriate alternate destination for the transfer and presents alternate destination to administrator.

Case in which Target is Specified by Frontend Virtual N_Port

FIG. 21 illustrates flowchart of a process for inspecting use of the inter-unit network after an instructed transfer in the case that the target of the transfer is specified by the administrator with a frontend virtual N_Port. The explanation set forth is for an example in which the frontend virtual N_Port with WWPN_V1 in FIG. 13 is instructed to be transferred to storage control unit 101b (unit_2).

At step 2201, management server 160 makes a check to determine whether the destination control unit (i.e., unit_2) has a path to the same LUs in the volume group (i.e., Group1) to which the specified frontend virtual N_Port belongs. This check can be performed by searching integrated volume group mapping table 3303 with WWPN_V1 and integrated physical path management table 3304 for control unit 101b (unit_2). In the above cases, from the first row 3333 of integrated volume group mapping table 3303, WWPN_8 is identified as the WWPN of the external storage control unit 130 where actual LUs are located for the VLUs which reside in the same group as WWPN_V1 (i.e., Group1). And then, from the fifth row 3334 of integrated physical path management table 3304, there is a path to WWPN_8 from unit_2, and the path is from physical N_Port with WWPN of WWPN_6 on unit_2. If a path is found, the process goes to step 2202; otherwise, the process goes to step 2204.

At step 2202, management server 160 makes a check to determine whether or not the found path is working properly. This status can be checked from the status field 1502 in the same row 3334 in integrated physical path management table 3304 referred to in step 2201. In the above example, the path is working properly because "OK" is located in the status field 1502. If the path is working properly, the process goes to step 2203; otherwise, the process goes to step 2204.

At step 2203, management server 160 determines to transfer backend virtual N_Port in the same group as the specified frontend virtual N_Port to the physical N_Port on the specified control unit 101 found in step 2201 at the same time as the transfer of the font end virtual N_Port. In the above example, virtual N_Port with WWPN_V3 and N_Port_ID_V3 is determined to be able to be transferred to WWPN_6 on control unit 101b (unit_2), as found in step 2201.

At step 2204, management server 160 makes a check to determine whether there is an alternative control unit 101 having working paths to the host and LUs in the same group as the specified frontend virtual N_Port. As in step 2201, this check can be done by searching integrated physical path management table 3304 using the values in target host N_Port field 1402 and external N_Port field 1404 in the same group as the specified frontend virtual N_Port. If an alternative control unit 101 is found, the process goes to step 2205; otherwise, the process goes to step 2208.

At step 2205, management server 160 presents the alternative unit to administrator.

At step 2206, management server 160 makes an inquiry to the administrator to determine whether transferring the processing to an alternative storage control unit 101 is OK. If the alternative storage control unit 101 is OK, the process goes to step 2207. If the alternative storage control unit 101 is not OK, the process goes to step 2208.

At step 2207, management server 160 determines to transfer both the frontend virtual N_Port and backend virtual N_Port to the alternative storage control unit 101.

At step 2208, management server 160 warns administrator that the inter-unit network 113 will need to be used after the specified frontend virtual N_Port is transferred to the specified storage control unit.

At step 2209, management server 160 makes a check to the administrator to determine whether use of the inter-unit network 113 is acceptable after the transfer is completed. If use of the inter-unit network is acceptable, the process goes to step 2211; otherwise, the process goes to step 2210.

At step 2210, management server 160 aborts the transfer if the use of the inter-unit network is not acceptable to the administrator, and notifies the administrator of the abort.

At step 2211, management server 160 determines to transfer only the specified frontend virtual N_Port. In this case, the inter-unit network 113 will be used. Therefore, the access path from host 150 to LU1 will be as illustrated in FIG. 19, and the processing performance will be degraded.

Case in which Target is Specified by Backend Virtual N_Port

FIG. 22 illustrates an exemplary flowchart of inspecting use of an inter-unit path after receiving an instruction to transfer in the case that the target of the transfer is specified by the administrator by specifying the backend virtual N_Port. An example is described below for the case where backend virtual N_Port with WWPN_V3 in FIG. 13 is specified to be transferred to storage control unit 101b (unit_2).

At step 2301, management server 160 makes a check to determine whether the destination unit has a path to the same host to which VLUs in the volume group are exported. This check can be performed by searching integrated volume group mapping table 3303 using "WWPN_V3" and integrated physical path management table 3304 with "unit_2". In the above cases, from the first row 3333 of integrated volume group mapping table 3303, WWPN_1 is identified as the WWPN of the host 150 to which the VLUs in the same group as WWPN_V3 are exported. Also, from the second row 3335 of integrated physical path management table 3304, it may be seen that there is a path to WWPN_1 from unit_2, and the path is from physical N_Port with WWPN_3 on unit_2. If a path is found, the process goes to step 2302; otherwise, the process goes to step 2304.

At step 2302, management server 160 makes a check to determine whether the found path is working or not. The status of the path can be checked from status field 1502 in the same row 3335 in integrated physical path management table 3304 referred to in step 2301. In the above case, the path is working because "OK" is in the status field 1502. If the path is working, the process goes to step 2303; otherwise, the process goes to step 2304.

At step 2303, management server 160 determines to transfer the frontend virtual N_Port in the same group as the specified backend virtual N_Port to the specified unit at the same time as the transfer of the backend virtual N_Port. In the above case, frontend virtual N_Port with WWPN_V1 and N_Port ID_V1 is determined to be transferred to WWPN_2 on unit_2 101b when the transfer of WWPN_V3 takes place.

Step 2304, management server 160 makes a check to determine whether there is an alternative unit having working paths to both the host and the LUs in the same group as the specified backend virtual N_Port "WWPN_V3". As in step 2301, this check can be done by searching integrated physical path management table 3304 with the values in target host N_Port field 1402 and external N_Port field 1404 in the same group as the specified backend virtual N_Port. If found, the process goes to step 2305; otherwise, the process skips to step 2308.

At step 2305, management server 160 illustrates the alternative storage control unit 101 to the administrator.

At step 2306, management server 160 sends an inquiry to the administrator to determine whether transferring the backend virtual N_Port to the alternative storage control unit is acceptable. If transferring to the alternative storage control unit 101 is acceptable, the process goes to step 2307; if not, the process goes to step 2308.

At step 2307, management server 160 determines to transfer frontend virtual N_Port and backend virtual N_Port to the alternative storage control unit 101.

At step 2308, management server 160 warns the administrator that the inter-unit network will need to be used after the specified backend virtual N_Port is transferred to the specified storage control unit 101.

Step 2209: management server 160 makes a check to the administrator to determine whether use of the inter-unit network 113 after transfer is acceptable. If it is acceptable, the process goes to step 2311; otherwise, the process goes to step 2310.

At step 2310, management server 160 aborts the transfer and notifies administrator of the aborted transfer.

At step 2311, management server 160 determines to transfer the specified backend virtual N_Port only. In this case, inter-unit network 113 will need to be used following the transfer, thereby causing degraded performance between the host 150 and LUs LU1 and LU2.

Case in which Target is Specified by Volume Group

FIG. 23 illustrates an exemplary flowchart for inspecting whether use of the inter-unit path will be required following transfer in the case that the target of the transfer is specified by the administrator by specifying a volume group. The example discussed below is for the case where group1 in FIG. 13 is specified by an administrator to be transferred to storage control unit 101*b* ("unit_2").

At step 2401, management server 160 makes a check to determine whether the destination unit has a path to the same LUs in the specified volume group, and a path to the same host to which VLUs in the specified volume group are exported. This check can be done by searching integrated volume group mapping table 3303 for "group1", and integrated physical path management table 504 for "unit_2". In the example, from the first row 3333 of integrated volume group mapping table 503, WWPN_8 is identified as the WWPN of the external storage control unit 130 where actual LUs for VLUs in the specified volume group resides, and WWPN_1 is identified as the WWPN of the host to which the VLUs in the specified group are exported. From the second row 3335 and fifth row 3334 of integrated physical path management table 3304, there is a path to WWPN_1 and WWPN_8 from unit_2, and the path is from physical N_Ports with WWPN_2 and WWPN_6 on unit_2, respectively. When paths are found to the same LUs in the specified volume group, and to the same host to which VLUs in the specified volume group are exported, the process goes to step 2402; otherwise, the process goes to step 2404.

At step 2402, management server 160 makes a check as to whether the found paths are working or not. The status of the paths can be checked from status field 1503 by checking in the same rows 3334, 3335 in integrated physical path management table 3304 referred in step 2401. In the above case, "OK" is set in the status field 1503 in both columns. If the paths are working, the process goes to step 2403; otherwise, the process goes to step 2404.

At step 2403, management server 160 determines that it will transfer frontend and backend virtual N_Port in the specified volume group to the specified storage control unit 101 at the same time. In the example, virtual N_Port with WWPN_V1 and N_Port_ID_V1, and virtual N_Port with WWPN_V3 and N_Port_ID_V3 will be transferred to WWPN_2 and WWPN_6 on unit_2 (storage control unit 101*b*) as found in step 2401.

At step 2404, management server 160 makes a check to determine whether there is an alternative storage control unit 101 having working paths to the host and LUs in the specified volume group (i.e., group1). As in step 2401, this check can be carried out by searching integrated physical path management table 3304 with the values in target host N_Port field 1402 and external N_Port field 1404 in the specified volume group. If an alternative storage control unit 101 is found, the process goes to step 2405; otherwise, the process goes skips to step 2408.

At step 2405, management server 160 presents the alternative unit to administrator.

At step 2406, management server 160 makes an inquiry to the administrator to determine whether transferring the group to the alternative storage control unit 101 is acceptable. If the alternative transfer is acceptable, management server 160 proceeds to step 2407; if not, management server 160 proceeds to step 2408.

At step 2407, management server 160 determines that it will transfer frontend virtual N_Port and backend virtual N_Port to the alternative storage control unit 101.

At step 2408, management server 160 makes a check to determine whether the specified destination storage control unit 101 has either a path to the host or a path to the LUs. If yes, the process goes to step 2410; otherwise, the process goes to step 2409.

At step 2409, management server 160 aborts the transfer, and notifies administrator of the abort.

At step 2410, management server 160 warns administrator that the inter-unit network will need to be used after transfer of the specified frontend or backend virtual N_Port for the specified group to the specified unit.

At step 2411, management server 160 makes a check to administrator to determine if use of the inter-unit network 113 after transfer is acceptable. If it is acceptable, the process goes to step 2412; otherwise, the process goes to step 2409.

At step 2412, management server 160 determines to transfer either frontend or backend virtual N_Port. Which virtual N_Port will be transferred depends on which path was found in step 2408. If a path to the host is found, only the frontend virtual N_Port is transferred to the specified storage control unit 101, while if a path to the LUs is found, then only the backend virtual N_Port is transferred to the specified storage control unit 101.

Flowchart of Frontend Virtual N_Port Transfer

FIG. 24A illustrates an exemplary flowchart of a basic process for transferring frontend virtual N_Port when management server 160 determines that the frontend N_Port_ID should be transferred and instructs storage control units to carry out the transfer from a source storage control unit 3201 to a destination storage control unit 3202.

At step 3203, source storage control unit 3201 instructs the destination storage control unit 3202 to begin transfer of frontend virtual N_Port.

At step 3204, after receiving the instruction, destination storage control unit 3202 performs a fabric login procedure, as described with respect to FIG. 9 above, using a previously assigned N_Port_ID that was previously assigned to the frontend virtual N_Port. As illustrated in FIG. 9, frontend FC switch 140 modifies its routing table 1600 in response.

At step 3205, destination storage control unit 3202 suspends processing of frames received through the transferred frontend virtual N_Port since it is transferred in step 3204.

At step 3206, destination storage control unit 3202 sends a "COMPLETE" signal to source storage control unit 3201.

At step 3207, after receiving the "COMPLETE" signal, source storage control unit 3201 completes processing of frames that it received after it instructed destination storage control unit 3202 to begin the transfer in step 3203.

At step 3208, source storage control unit 3201 flushes all the pending write operations in the cache to external storage control unit 130.

At step 3209, source storage control unit 3201 sends a "READY" signal to the destination storage control unit 3202, indicating that the destination storage control unit 3202 in now ready to take over control of the processing from the host.

At step 3210, destination storage control unit 3202 performs a backend virtual N_Port transfer following the flowchart in FIG. 26 if it was determined that the backend virtual N_Port should be transferred at the same time.

At step 3211, destination storage control unit 3202 resumes processing of received frames through the transferred frontend virtual N_Port.

At step 3212, destination storage control unit 3202 modifies volume mapping table 503 to match the new configuration.

At step 3213, destination storage control unit 3202 sends a "COMPLETE" signal to source storage control unit 3201.

At step 3214, after receiving the "COMPLETE" signal, source storage control unit 3201 modifies volume mapping table 503 to match the new configuration.

Note that there will be a time lag between the moment that source storage control unit 3201 instructs destination storage control unit 3202 to begin transfer, and the moment that the frontend FC switch 140 changes the routing table. Therefore, some frames may arrive at the source storage control unit 3201 after the instruction is sent. Steps 3206 through 3209 are provided to complete processing of all frames sent out by host 150 during the delay period.

Flowchart of Frontend Virtual N_Port Transfer Utilizing BB_Credit Flow Control Mechanism As explained before, a BB_Credit flow control mechanism may be implemented between an N_Port and an F_Port. This mechanism may be used to make frontend FC switch 140 stop sending frames to source storage control unit 140, as described with respect to FIG. 24B. FIG. 24B illustrates an alternative process and flowchart for transferring frontend virtual N_Port utilizing a flow control mechanism when management server 160 has determined that frontend N_Port_ID should be transferred, and instructs storage control units to carry out the transfer. The advantage of the process of FIG. 24B over the process of FIG. 24A is that steps 3205-3209 are unnecessary in the process of FIG. 24B because the switch will stop the transfer from the host when the BB_Credit_CNT on F_Port becomes 0.

At step 2503, source storage control unit 2501 stops sending R_RDY responses to F_Port through the frontend virtual N_Port.

At step 2504, source storage control unit 2501 waits until BB_Credit_CNT on F_Port becomes "0", or a predetermined amount of time passes.

At step 2505, source storage control unit 2501 makes a check to determine whether BB_Credit_CNT became 0 in step 2504. If yes, the process goes to step 2506; otherwise, the process goes to step 2511. Note that when BB_Credit_CNT becomes 0 on the F_Port, the F_Port stops sending frames to the N_Port. However, time until BB_Credit_CNT becomes 0 depends on how frequently frames are sent to the N_Port. Therefore, storage control unit 101 proceeds to step 2513 if a predetermined time has passed in step 2504 to carry out transfer according to the process set forth in FIG. 24A.

At step 2506, source storage control unit 2501 completes processing of all the frames received up to that point.

At step 2507, source storage control unit 2501 flushes all the pending write operations stored in cache to the external storage control unit 130.

At step 2508, source storage control unit 2501 instructs the destination storage control unit 2502 to begin transfer of frontend virtual N_Port.

At step 2509, destination storage control unit 2502 performs backend virtual N_Port transfer following the flowchart in FIG. 30 if it was determined that the backend virtual N_Port should be transferred at the same time.

At step 2510, destination storage control unit 2502 performs the fabric login procedure set forth in FIG. 9 using the previously assigned N_Port_ID previously assigned to the frontend virtual N_Port. As illustrated in FIG. 9, frontend FC switch 140 modifies its routing table 1600 in response.

At step 2511, destination storage control unit 2502 resumes sending R_RDY responses through the frontend virtual N_Port that has now been transferred. Note that F_Port will resume sending frames to the virtual N_Port since BB_Credit_CNT on F_Port becomes greater or equal to 1.

At step 2512, destination storage control unit 2502 modifies volume mapping table 503 to reflect the new configuration.

At step 2514, destination storage control unit 2502 sends a "COMPLETE" signal to source storage control unit 2501.

At step 2515, after receiving the "COMPLETE" signal, source storage control unit 2501 modifies volume mapping table 503 to reflect the new configuration.

Flowchart of Frontend Virtual N_Port Transfer with FC Switch Assistance

FIG. 24C illustrates another example of an alternate process for transferring frontend virtual N_Port when management server 160 determines that the frontend N_Port_ID should be transferred, and instructs storage control units 101 to carry out the transfer. The process of this embodiment is assisted by frontend FC switch 140. Therefore, as illustrated in FIG. 25, frontend FC switch 140 has a virtual port transfer assistant 2600 in its memory 402. The process of 24C also has an advantage over the process of FIG. 24A that steps 3205-3209 are unnecessary in the process of FIG. 24C because the switch will stop the transfer from the host by itself using the virtual port transfer assistant 2600, which is a microprogram to suspend transfer of I/O from the host to the affected LUs during the virtual port transfer.

At step 2703, a source storage control unit 2701 notifies the frontend FC switch 2703 of N_Port_ID of a frontend virtual N_Port to be transferred.

At step 2704, after receiving the notification, frontend FC switch 2703 suspends transmitting frames to the frontend virtual N_Port.

At step 2705, frontend FC switch 2703 sends a "READY" signal back to source storage control unit 2701.

At step 2706, after receiving the "READY" signal, source storage control unit 2701 completes processing of all the frames that it has received up to that point.

At step 2707, source storage control unit 2501 flushes all the pending write operation from cache to the external storage control unit 130.

At step 2708, source storage control unit 2701 instructs destination storage control unit 2702 to begin transferring the frontend virtual N_Port.

At step 2709, destination storage control unit 3201 performs the backend virtual N_Port transfer according to the process set forth in FIG. 26 if it was determined that the backend virtual N_Port should be transferred at the same time.

At step 2710, after receiving the instruction, destination storage control unit 2702 performs the fabric login procedure set forth in FIG. 9 using the previously assigned N_Port_ID that was previously assigned to the frontend virtual N_Port. As illustrated in FIG. 9, frontend FC switch 140 modifies its routing table in response to reflect the new configuration.

At step 2711, frontend FC switch 140 resumes transmitting frames to the frontend virtual N_Port now configured on the destination storage control unit 2702.

At step 2712, destination storage control unit 2702 modifies volume mapping table 503 to reflect the new configuration.

At step 2713, destination storage control unit 2702 sends a "COMPLETE" signal to source storage control unit 2701.

At step 2714, after receiving the "COMPLETE" signal, source storage control unit 2701 modifies volume mapping table 503 to reflect the new configuration.

Flowchart of Backend Virtual N_Port Transfer

FIG. 26 illustrates an exemplary flowchart of a process for transferring a backend virtual N_Port when management server 160 has determined that the backend N_Port should be transferred at the same time as the frontend virtual N_Port, and has instructed the transfer of the virtual ports to storage control unit 101. This process is performed in step 3210 in FIG. 24A, step 2509 in FIG. 24B, or step 2709 in FIG. 24C.

At step 2802, destination storage control unit 3202, 2502, 2702 performs the fabric login procedure set forth in FIG. 9 using the previously assigned N_Port_ID which was previously assigned to the backend virtual N_Port being transferred. As described in FIG. 9, backend FC switch 120 modifies its routing table 1700 in response.

At step 2803, destination storage control unit 3202, 2502, 2702 modifies its volume mapping table 503 to reflect the new configuration.

Examples of Management and Routing Tables after Transfer

FIG. 27A to FIG. 29 illustrate examples of management tables 3303, 503 in management server 160 and storage control units 101, respectively, and routing tables 1600, 1700 in FC switches 140 and 120, respectively, in the case where group1 on unit_1 in FIG. 13 is transferred to unit_2. In FIG. 27A, the entry for group1 has been removed from volume group mapping table 503 on storage control unit 101*a*. In FIG. 27 B, an entry for group1 has been added to volume group mapping table 503 on storage control unit 101*b*. As illustrated in FIG. 27C, in integrated volume group mapping table on management host, entries 1410, 1411 and 1412 have been modified to reflect that group1 is now on unit_2 and has a current frontend physical N_Port of WWPN_3 and a current backend physical end port of WWPN_6. Further, as illustrated in FIG. 28, in routing table 1600 on frontend FC switch 140, F_Port entry 1601 is now Port_3 for WWPN_V1. Additionally, as illustrated in FIG. 29, in routing table 1700 on backend switch 120, F_Port entry 1701 is now Port_2 for WWPN_V3.

Accordingly it may be seen that the invention addresses the problem that the inter-unit network might be inadvertently used in a storage system that comprises multiple storage control units. The storage system according to the invention has a function to provide and use virtual ports, and to transfer the virtual ports among physical ports on storage control units making up the storage system. Further, the storage system is able to manage logical volumes and/or virtual volumes and virtual ports as a group when considering whether to move logical/virtual volumes and virtual ports to another storage control unit. When an administrator instructs the storage system to transfer one or more virtual ports, one or more volumes, or a group of virtual ports and volumes among the storage control units, such as for load balancing, the storage system determines whether the communications between the multiple storage control units will be required after the transfer for processing I/O requests. When the storage system determines that the inter-unit network will have to be used if the transfer takes place, the storage system is able to determine and present an alternate storage control unit so that the inter-unit network will not need to be used after if the transfer. Further, while the invention has been described as taking place in response to an instruction to transfer one or more virtual ports, one or more volumes, or a group of virtual ports and volumes among the storage control units, the invention is also applicable to the situation in which an administrator requests that the storage system locate a suitable storage control unit to be a target of such a transfer.

From the foregoing, it will be apparent that the invention provides methods and apparatuses for determining an optimal storage control unit to be a target of a transfer of one or more virtual ports, one or more volumes, or a group of virtual ports and volumes among multiple storage control units by taking into consideration whether an inter unit network will be required to be used. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A storage system comprising:
   multiple storage control units in communication with each other via a network, each storage control unit including at least one physical port for communication with a first Fibre Channel (FC) switch;
   at least one first virtual port created on a first one of said physical ports in a first storage control unit of said multiple storage control units; and
   a first virtual volume created on the first storage control unit, said first virtual volume mapping to a logical volume on an external storage system in communication with said first storage control unit,
   wherein a computer accesses the first virtual volume via the first virtual port for accessing the logical volume,
   wherein, when considering whether the first virtual port and said first virtual volume are able to be transferred to another physical port on a second one of said storage control units, a determination is made as to whether direct communication between said multiple storage control units will be required for accessing the logical volume via said first virtual port and said first virtual volume on said second storage control unit,
   wherein, when the determination indicates that direct communication between said multiple storage control units will be required for accessing the logical volume through said first virtual port and said first virtual volume on said second storage control unit, an alternative storage control unit is located as a target, to which the first virtual port and the first virtual volume are able to be transferred instead of said second storage control unit, so as to avoid direct communication between said storage control units when accessing the logical volume through said first virtual port and said first virtual volume.

2. The storage system according to claim 1,
wherein the direct communication between said storage control units to be avoided is via an inter-unit path between said storage control units.

3. The storage system according to claim 1,
wherein an administrator is notified that communication between the multiple storage control units will be required for accessing the logical volume through said first virtual port and said first virtual volume on said second storage control unit, and the administrator is presented with the alternative storage control unit as an alternative target for transfer of the first virtual port and first virtual volume.

4. The storage system according to claim 1,
wherein a management server in communication with said multiple storage control units determines whether communication between said multiple storage control units will be required for accessing the logical volume through said first virtual port and said first virtual volume on said second storage control unit, and
wherein said management server is configured to locate an alternative storage control unit as a target to which the first virtual port and the first virtual volume are moved so that communication between said storage control units is not required for accessing the logical volume via said first virtual port and said first virtual volume.

5. The storage system according to claim 1,
wherein the first virtual port is transferred to the second storage control unit as a result of the second storage control unit requesting a fabric login from the first FC switch using an existing identifier for the first virtual port, and
wherein the second storage control unit suspends frames received from the computer, waits until all frames received from the computer by the first storage control unit have been processed, and resumes processing of frames received from the computer directed to accessing the first logical volume via the first virtual port and the first virtual volume.

6. The storage system according to claim 1,
wherein, before the first virtual port is transferred to said second storage control unit, in a case where flow control is used for said FC switch, the first storage control unit stops sending to the FC switch responses for received frames until a buffer on the FC switch becomes full,
wherein the first storage control unit completes processing of the received frames and instructs the second storage control unit to begin transfer of the first virtual port, and
wherein said second storage control unit requests a fabric login from the first FC switch using an existing identifier for the first virtual port to transfer the first virtual port to the second storage controller and said second storage controller resumes sending responses to the FC switch for frames received from the computer for accessing the first logical volume via the first virtual port and the first virtual volume.

7. The storage system according to claim 1,
wherein, before the first virtual port is transferred to said second storage control unit, the first storage control unit sends a notification to the FC switch identifying the first virtual port as a port to be transferred,
wherein the first FC switch suspends transmission of frames to the first virtual port,
wherein the first storage control unit completes processing of received frames and instructs the second storage control unit to begin transfer of the first virtual port,
wherein said second storage control unit requests a fabric login from the first FC switch using an existing identifier for the first virtual port to transfer the first virtual port to the second storage controller, and
wherein said first FC switch resumes sending frames received from the computer to the first virtual port on said second storage control unit for accessing the first logical volume via the first virtual port and the first virtual volume.

8. The storage system according to claim 1, further comprising:
a second FC switch, said second FC switch being a backend FC switch for routing communication between said multiple storage control units and the external storage system,
wherein said first FC switch is a frontend FC switch for routing communication between said multiple storage control units and the computer,
wherein a second virtual port is created on a second physical port on said firs storage control unit for sending access requests related to said first virtual volume from said first storage controller to said external storage system, and
wherein when said first virtual port and said first virtual volume are transferrec to one of said physical ports on a second one of said storage control units, the second virtual port is also transferred one of said physical ports on the second storage system.

9. A method of operating a storage system having multiple storage control units in communication with each other via a network, each storage control unit including one or more physical ports for communication with a first Fibre Channel (FC) switch, the method comprising:
creating at least one first virtual port on a first one of said physical ports in a first storage control unit of said multiple storage control units;
mapping a first virtual volume on the first storage control unit to a logical volume on an external storage system in communication with said first storage control unit, whereby a computer in communication with said FC switch is able to access said logical volume by accessing said first virtual volume via the first virtual port;
determining whether direct communication between said multiple storage control units will be required for the computer to access the logical volume through said first virtual port and said first virtual volume on a second one of said storage control units, when considering whether the first virtual port and the first virtual volume are able to be transferred to another physical port on the second storage control unit; and
locating an alternative storage control unit as a target, to which the first virtual port and the first virtual volume are able to be moved instead of said second storage control unit, so as to avoid direct communication between said storage control units for accessing the logical volume through said first virtual port and said first virtual volume, when it is determined that direct communication between said multiple storage control units will be required for accessing the logical volume through said first virtual port and said first virtual volume on said second storage control unit.

10. The method according to claim 9, wherein the direct communication between said storage control units to be avoided is via an inter-unit path between said storage control units.

11. The method according to claim 9, further including steps of
notifying an administrator that communication between the multiple storage control units will be required for accessing the logical volume through said first virtual port and said first virtual volume on said second storage control unit; and
presenting the administrator with the alternative storage control unit as an alternative target for transfer of the first virtual port and first virtual volume.

12. The method according to claim 9, further including steps of
transferring the first virtual port to said second storage control unit as a result of said second storage control unit requesting a fabric login to the first FC switch using an existing identifier for the first virtual port;
suspending frames received from said computer by said second storage control unit until all frames received from the computer by first storage control unit have been processed; and
resuming, by the second storage control unit, processing of frames received from the computer directed to accessing the first logical volume via the first virtual port and the first virtual volume.

13. The method according to claim 9, further including steps of
before the first virtual port is transferred to said second storage control unit, stopping, by the first storage control unit, sending to the FC switch responses for received frames until a buffer on the FC switch becomes full, in a case where flow control is used for said FC switch,
completing of processing of the received frames in the first storage control unit;
instructing the second storage control unit to begin transfer of the first virtual port;
requesting, by said second storage control unit, a fabric login to the first FC switch using an existing identifier for the first virtual port to transfer the first virtual port to the second storage controller; and
resuming, by said second storage control unit, sending of responses to the FC switch for frames received from the computer for accessing the first logical volume via the first virtual port and the first virtual volume.

14. The method according to claim 9, further including steps of
before the first virtual port is transferred to said second storage control unit, sending, by the first storage control unit, a notification to the FC switch identifying the first virtual port as a port to be transferred;
suspending, by the first FC switch, transmission of frames to the first virtual port;
completing of processing of received frames by the first storage control unit and instructing the second storage control unit to begin transfer of the first virtual port;
requesting, by said second storage control unit, a fabric login to the first FC switch using an existing identifier for the first virtual port to transfer the first virtual port to the second storage controller; and
resuming by said first FC switch sending of frames received from the computer to the first virtual port on said second storage control unit for accessing the first logical volume via the first virtual port and the first virtual volume.

15. A storage system comprising:
multiple storage control units in communication with each other via an inter-unit network,
each storage control unit including one or more physical ports for communication with one or more Fibre Channel (FC) switches;
a frontend virtual port created on one of said one or more physical ports in a first storage control unit of said multiple storage control units, and a backend virtual port created on one of said one or more physical ports in the first storage control unit; and
a virtual volume created on the first storage control unit, said virtual volume mapping to a logical volume on an external storage system in communication with said first storage control unit,
wherein, when a computer in communication with one of the one or more FC switches sends access requests to the virtual volume via the frontend virtual port, the first storage control unit sends converted access requests to the logical volume on the external storage system via the backend virtual port;
wherein, prior to a transfer of the frontend virtual port, the backend virtual port and the virtual volume from the first storage control unit to another storage control unit of said multiple storage control units, a determination is made regarding whether direct communication between the multiple storage control units will be required following the transfer when responding to the access requests from the computer, and
wherein, when the results of the determination are that direct communication between the multiple storage control units will be required, an alternative storage control unit is located as a target of the transfer so as to avoid direct communication between the multiple storage control units when responding to the access requests from the computer.

16. The storage system according to claim 15,
wherein the direct communication between said multiple storage control units to be avoided is via an inter-unit path between said storage control units.

17. The storage system according to claim 15,
wherein, when the frontend virtual port, the backend virtual port and the virtual volume are transferred to a second storage control unit in communication with the external storage system, the computer is able to send the access requests to the virtual volume via the frontend virtual port and the second storage control unit sends converted access requests to the logical volume on the external storage system via the backend virtual port without having to change the configuration information on the computer.

18. The storage system according to claim 15,
wherein the frontend virtual port has a first identifier assigned by the one or more FC switches and the backend virtual port has a second identifier assigned by the one or more FC switches, said first and second identifiers being used by the one or more FC switches for routing the access requests, and
wherein the frontend virtual port retains the first identifier and the backend virtual port retains the second identifier when the frontend virtual port and backend virtual port are transferred to the second storage control unit.

19. The storage system according to claim 18,
wherein the frontend virtual port retains the first identifier and the backend virtual port retains the second identifier due to the second storage control unit using a fabric login procedure for said one or more physical ports on said second storage control unit using the first identifier for the frontend virtual port and the second identifier for the backend virtual port.

20. The storage system according to claim 15,
wherein said one or more FC switches include a frontend FC switch for routing communication between the computer and the multiple storage control units and a backend FC switch for routing communication between the multiple storage control units and the external storage system,
wherein the one or more physical ports include a frontend physical port for communication with said frontend FC switch and a backend physical port for communication with the backend FC switch, and
wherein the frontend virtual port is created on said frontend physical port and the backend virtual port is created on said backend physical port.

* * * * *